(12) United States Patent
Tsurusawa

(10) Patent No.: US 10,095,706 B2
(45) Date of Patent: Oct. 9, 2018

(54) DATA ACCESS SYSTEM AND DATA ACCESS METHOD

(71) Applicant: FUJITSU LIMITED, Kawasaki-shi, Kanagawa (JP)

(72) Inventor: Ryusuke Tsurusawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 719 days.

(21) Appl. No.: 14/661,140

(22) Filed: Mar. 18, 2015

(65) Prior Publication Data

US 2015/0278247 A1    Oct. 1, 2015

(30) Foreign Application Priority Data

Mar. 28, 2014 (JP) ................. 2014-060951

(51) Int. Cl.
G06F 7/00 (2006.01)
G06F 17/30 (2006.01)
H04L 29/08 (2006.01)

(52) U.S. Cl.
CPC .. G06F 17/30203 (2013.01); G06F 17/30312 (2013.01); H04L 67/1097 (2013.01)

(58) Field of Classification Search
CPC ............................................... G06F 17/30312
See application file for complete search history.

(56) References Cited

U.S. PATENT DOCUMENTS

| | | | |
|---|---|---|---|
| 6,356,863 B1 | 3/2002 | Sayle | |
| 2009/0089335 A1* | 4/2009 | Shitomi | G06F 17/30073 |
| 2009/0319736 A1* | 12/2009 | Otani | G06F 17/30073 711/162 |
| 2010/0058476 A1* | 3/2010 | Isoda | G06F 21/6227 726/26 |
| 2010/0235410 A1* | 9/2010 | Apacible | G06F 21/6218 707/812 |

FOREIGN PATENT DOCUMENTS

| | | | | |
|---|---|---|---|---|
| JP | 2002-524793 A | | 8/2002 | |
| JP | 2003-044225 A | | 2/2003 | |
| JP | 2005099911 A | * | 4/2005 | |
| JP | WO 2006118171 A1 | * | 11/2006 | ......... G06F 21/6227 |
| JP | 2006331411 A | * | 12/2006 | ......... G06F 21/6227 |
| JP | 2007-073004 A | | 3/2007 | |
| JP | 2008191897 A | * | 8/2008 | |
| JP | 2009042851 A | * | 2/2009 | |

OTHER PUBLICATIONS

JPOA—Japanese Office Action of Japanese Patent Application No. 2014-069051, dated Jan. 9, 2018, with relevant machine translation.

* cited by examiner

Primary Examiner — Ajith Jacob
(74) Attorney, Agent, or Firm — Fujitsu Patent Center

(57) ABSTRACT

A first information processing apparatus includes a storage device configured to store a plurality of division data, into which processing target data is divided, in a plurality of positions, and the second information processing apparatus includes a first storage unit configured to store storage position information of the respective division data of the storage device and configuration information for restoring the processing target data from the division data. Even when the storage device is accessed in an unauthorized manner, data leakage can be prevented.

16 Claims, 21 Drawing Sheets

FIG. 6A

FILE NAME: aaaa.xls

| CONFIGURATION NUMBER | DISK NUMBER | SECTOR POSITION INFORMATION | ATTRIBUTE 1 |
|---|---|---|---|
| 1 | 1 | 67 | 20131022144200 |
| 2 | 1 | 3555 | |
| 3 | 3 | 123111 | |
| 4 | 2 | 654 | |
| 5 | 2 | 9000 | |
| 6 | 2 | 543 | |

FILE NAME: bbbb.txt

| CONFIGURATION NUMBER | DISK NUMBER | SECTOR POSITION INFORMATION | ATTRIBUTE 1 |
|---|---|---|---|
| 1 | 1 | 28 | 20131022144200 |
| 2 | 1 | 3 | |
| 3 | 3 | 1346 | |
| 4 | 2 | 110 | |

DISK 1 SECTOR MANAGEMENT TABLE ~26

| SECTOR POSITION INFORMATION | STATE | ATTRIBUTE 1 | ATTRIBUTE 2 |
|---|---|---|---|
| 1 | RESERVED | 20131022145034 | a |
| 2 | USED | 20131021203411 | b |
| 3 | EMPTY | null | null |
| 4 | EMPTY | null | null |
| 5 | USED | 20120429034450 | c |
| 6 | USED | 20131021203411 | b |

FIG. 8B

DISK 2 SECTOR MANAGEMENT TABLE ~26

| SECTOR POSITION INFORMATION | STATE | ATTRIBUTE 1 | ATTRIBUTE 2 |
|---|---|---|---|
| 1 | USED | 20120429034450 | c |
| 2 | USED | 20131021203411 | b |
| 3 | USED | 20130105114556 | d |
| 4 | EMPTY | null | null |
| 5 | RESERVED | 20131022145034 | a |
| 6 | RESERVED | 20131022145034 | a |

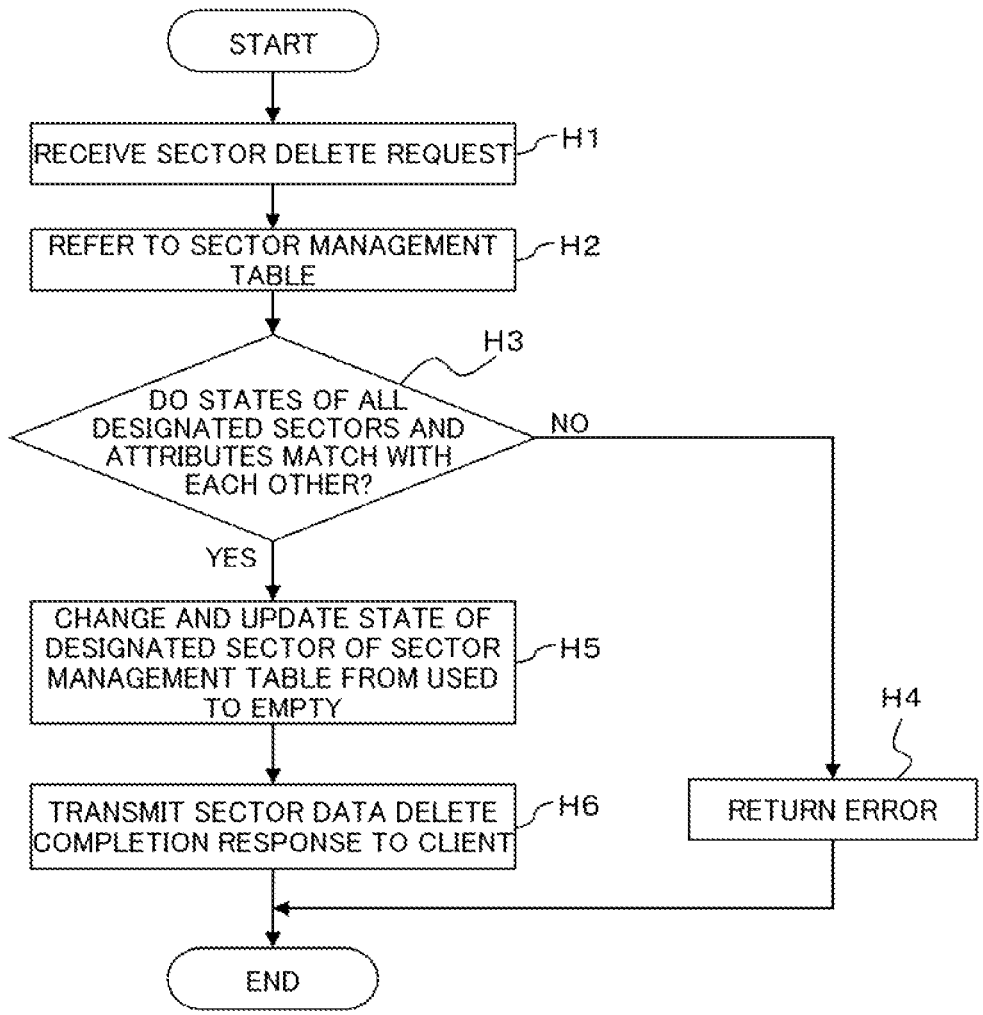

DATA ACCESS SYSTEM AND DATA ACCESS METHOD

CROSS-REFERENCE TO RELATED APPLICATION

This application is based upon and claims the benefit of priority of the prior Japanese Patent application No. 2014-069051, filed on Mar. 28, 2014, the entire contents of which are incorporated herein by reference.

FIELD

The embodiments discussed herein are directed to a data access system and a data access method.

BACKGROUND

As a data storing method of a network system, file systems, such as a network file system (NFS) or a common Internet file system (CIFS), are known. A file server provides functions as such file systems by executing a server program of the NFS or the CIFS.

In a case where such file systems are used through an external network, an account and a password are commonly used as an authentication key.

Patent Literature 1: JP 2003-044225 A

Patent Literature 2: JP 2002-524793 A

Patent Literature 3: and JP 2007-073004 A

However, in such a network system of the related art, if information of the account and the password leaks out, an unauthorized access may be performed by spoofing of the third party, causing the occurrence of data leakage.

SUMMARY

According to an aspect of the embodiments, a data access system includes: a first information processing apparatus; and a second information processing apparatus, wherein the first information processing apparatus includes a storage device configured to store a plurality of division data, which processing target data is divided, in a plurality of positions, and wherein the second information processing apparatus includes a first storage unit configured to store storage position information of the respective division data of the storage device and configuration information for restoring the processing target data from the division data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A and 6B are diagrams illustrating data management tables in a network system as an example of an embodiment;

FIGS. 8A and 8B are diagrams illustrating sector management tables in a network system as an example of an embodiment;

FIG. 21 is a flowchart describing a data file delete process by a client terminal in a storage system as an example of an embodiment.

DESCRIPTION OF EMBODIMENT(S)

Figure 1:
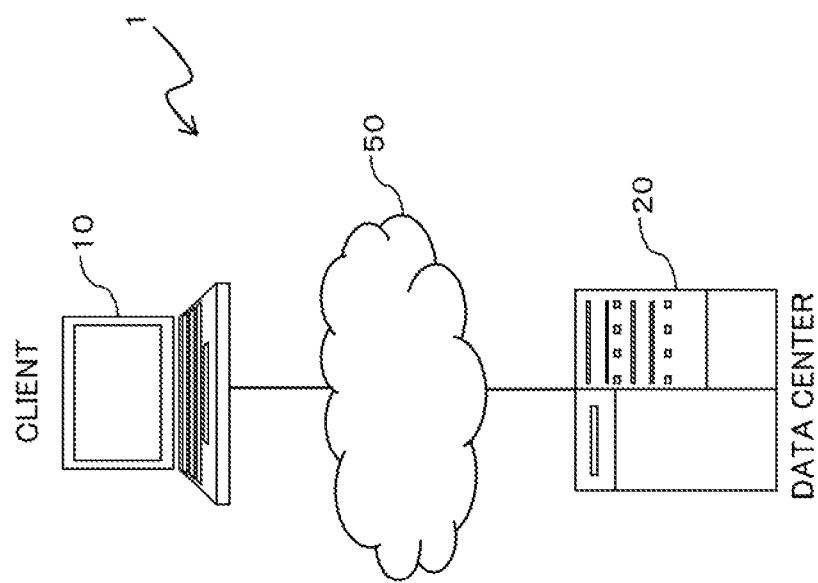
FIG. 1 is a diagram schematically illustrating a network configuration of a network system as an example of an embodiment.

Hereinafter, a data access system and a data access method according to embodiments will be described with reference to the drawings. However, the following embodiments are merely exemplary. Unless otherwise specified in the following embodiments, the following embodiments are not intended to exclude various modifications or technical applications. That is, the present embodiments can be carried out in various forms without departing from the scope of the present embodiments. In addition, each drawing can include other functions or the like, instead of the effect that includes only components illustrated in the drawing.

(A) Hardware Configuration

FIG. 1 is a diagram schematically illustrating a network configuration of a network system (data access system) 1 as an example of an embodiment.

As illustrated in FIG. 1, the network system 1 includes a management server 20 and one or more (one in the example illustrated in FIG. 1) client terminal 10. Also, the management server 20 and the client terminal 10 are connected to be communicable through a network 50. The network 50 is a communication line such as a local area network (LAN).

(A-1) Management Server

First, the hardware configuration of the management server 20 will be described.

The management server 20 is an information processing apparatus having a server function. For example, the management server 20 has a function as a storage server and provides a storage area to the client terminal 10. The management server 20 is disposed in, for example, a data center. The management server 20 transmits or receives a command of a network attached storage (NAS) or a storage area network (SAN) with respect to the client terminal 10.

Figure 2:
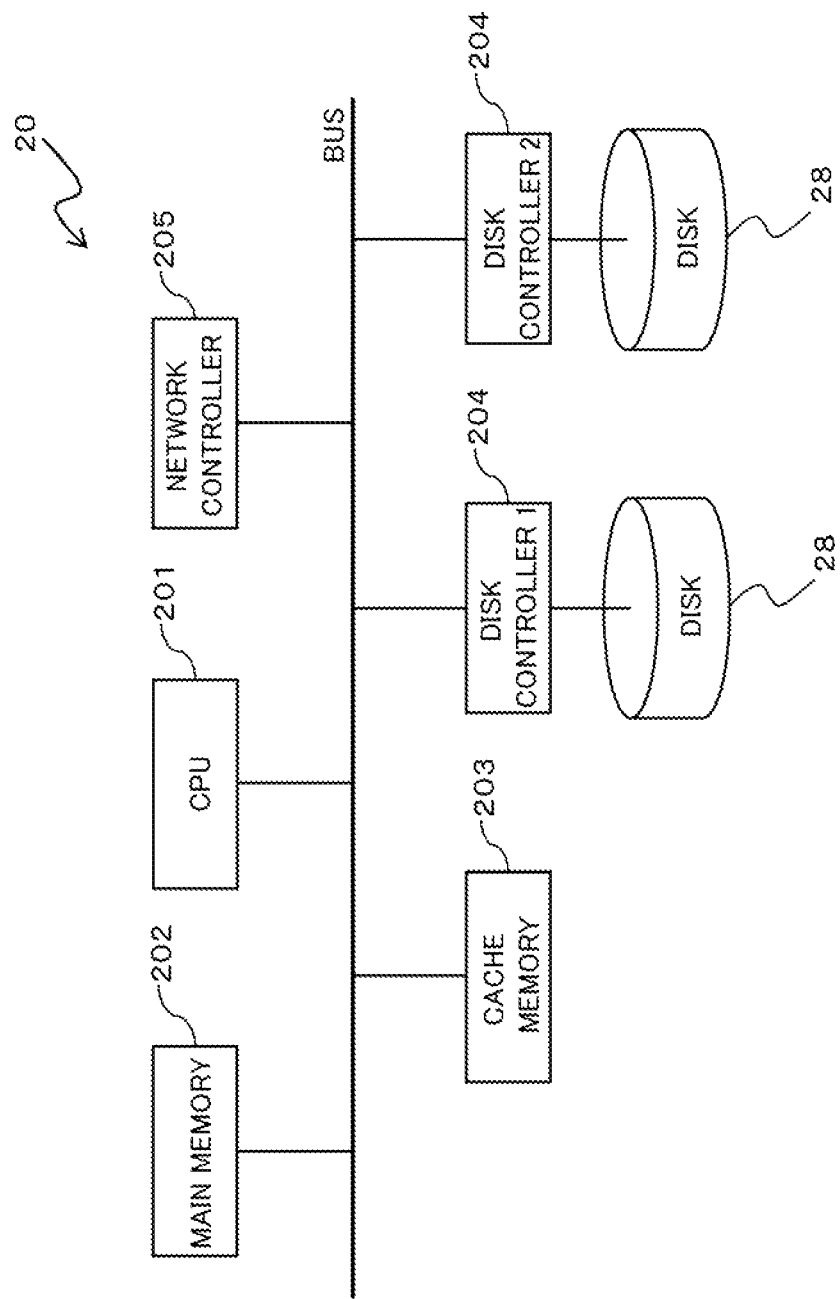
FIG. 2 is a diagram illustrating a hardware configuration of a management system of a network system as an example of an embodiment.

FIG. 2 is a diagram illustrating the hardware configuration of the management server 20 of the network system 1 as an example of an embodiment.

As illustrated in FIG. 2, the management server 20 includes a CPU 201, a main memory 202, a cache memory 203, a disk controller 204, a network controller 205, and a storage device 28.

The main memory 202 is, for example, a random access memory (RAM) and is used as a primary storage memory or a working memory. For example, a software program related to data communication control or data types for the program are written in the main memory 202. The software program on the main memory 202 is loaded and executed on the CPU 201.

The cache memory 203 is a storage area in which data read from or written to the storage device 28 is temporarily stored.

The disk controller 204 is connected to the storage device 28 and controls a data write or read with respect to the storage device 28. The storage device 28 is a storage device such as a hard disk drive (HDD) or a solid state drive (SSD) and stores various data. In the present embodiment, an example in which the storage device 28 is an HDD is described. Hereinafter, there is a case where the storage device 28 is a disk 28.

The storage device 28 includes a disk (platter) that is coated with a magnetic material). Also, the platter is partitioned into concentric tracks and includes sectors obtained by dividing each track in units of predetermined sizes (for example, 512 bytes) in a rotating direction. Also, each of the storage devices 28 is identified by a disk number to be described below (see FIGS. 6A and 6B or the like).

The network controller 205 controls data communication through the network 50 and realizes data reception and transmission with the client terminals 10.

Figure 4:
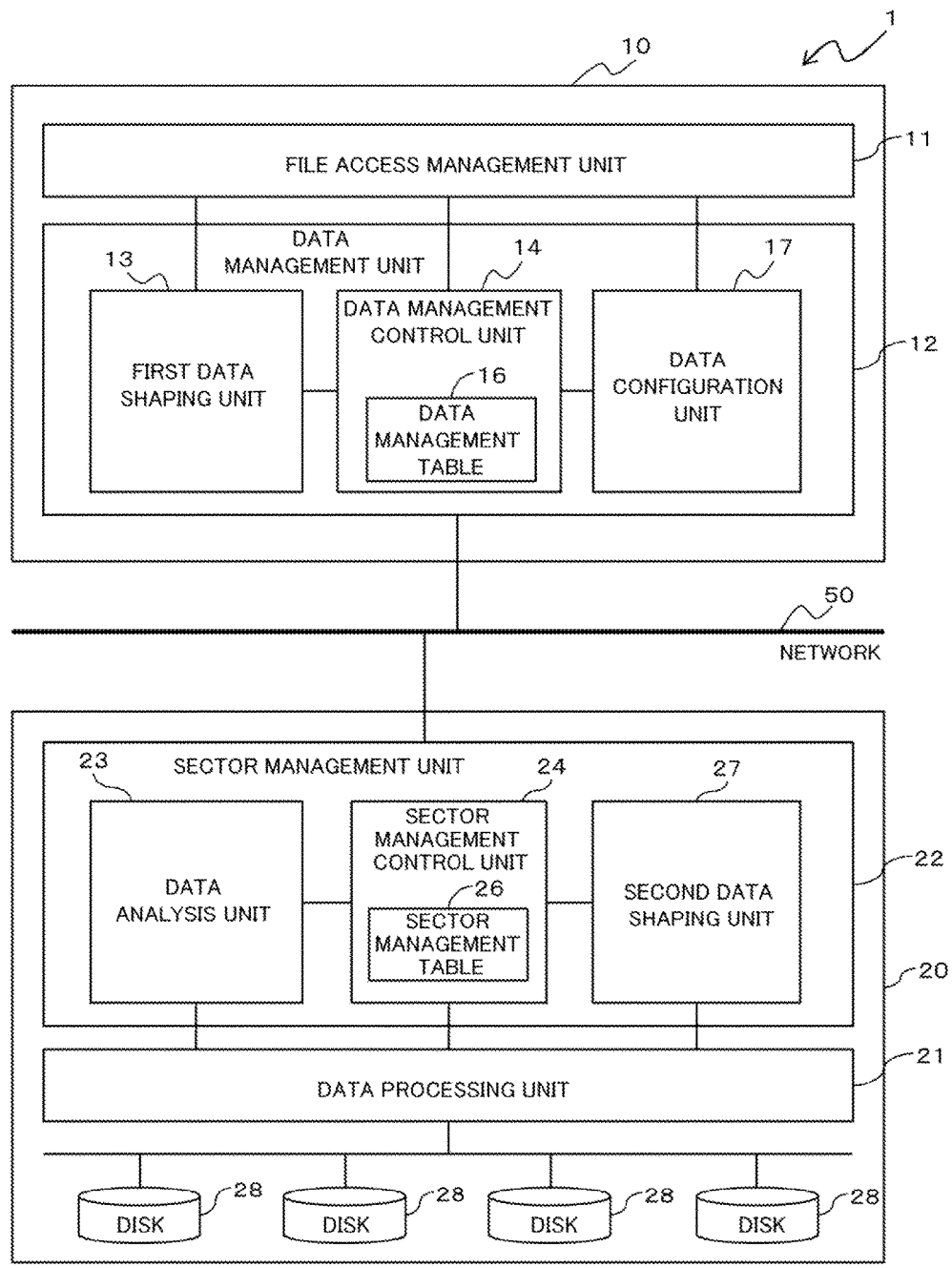
FIG. 4 is a diagram illustrating a functional configuration of a network system as an example of an embodiment.

The CPU 201 is a processor that performs various controls or arithmetic operations. The CPU 201 realizes various functions by executing an OS or a program stored in the main memory 202 or the like. That is, as illustrated in FIG. 4, the CPU 201 realizes function as a data processing unit 21 and a sector management unit 22. A description about the functions as the data processing unit 21 and the sector management unit 22 will be described below.

By executing a management program, the CPU 201 functions as the data processing unit 21 and the sector management unit 22.

The program (management program) for realizing the functions as the data processing unit 21 and the sector management unit 22 is provided in a form to be recorded in a computer-readable recording medium, such as a flexible disk, a CD (CD-ROM, CD-R, CD-RW, etc.), a DVD (DVD-ROM, DVD-RAM, DVD-R, DVD+R, DVD-RW, DVD+RW, HD DVD, etc.), a Blu-ray disk, a magnetic disk, an optical disk, a magneto-optical disk, or the like. The computer reads the program from the recording medium and transfers and stores the program to an internal storage device or an external storage device. Also, for example, the program may be recorded in a storage device (recording medium) such as a magnetic disk, an optical disk, or a magneto-optical disk, and be provided from the storage device to the computer through a communication path.

When realizing the functions as the data processing unit 21 and the sector management unit 22, the program stored in the internal storage device (the main memory 202 or the cache memory 203 in the present embodiment) is executed by a microprocessor (CPU 201 in the present embodiment) of the computer. At this time, the program stored in the recording medium may be read and executed by the computer.

(A-2) Client Terminal

Next, the hardware configuration of the client terminal 10 will be described.

For example, the client terminal 10 writes data to or read data from the storage area, which is provided by the management server 20, by transmitting a disk access command of a NAS, such as read/write, to the management server 20.

Figure 3:
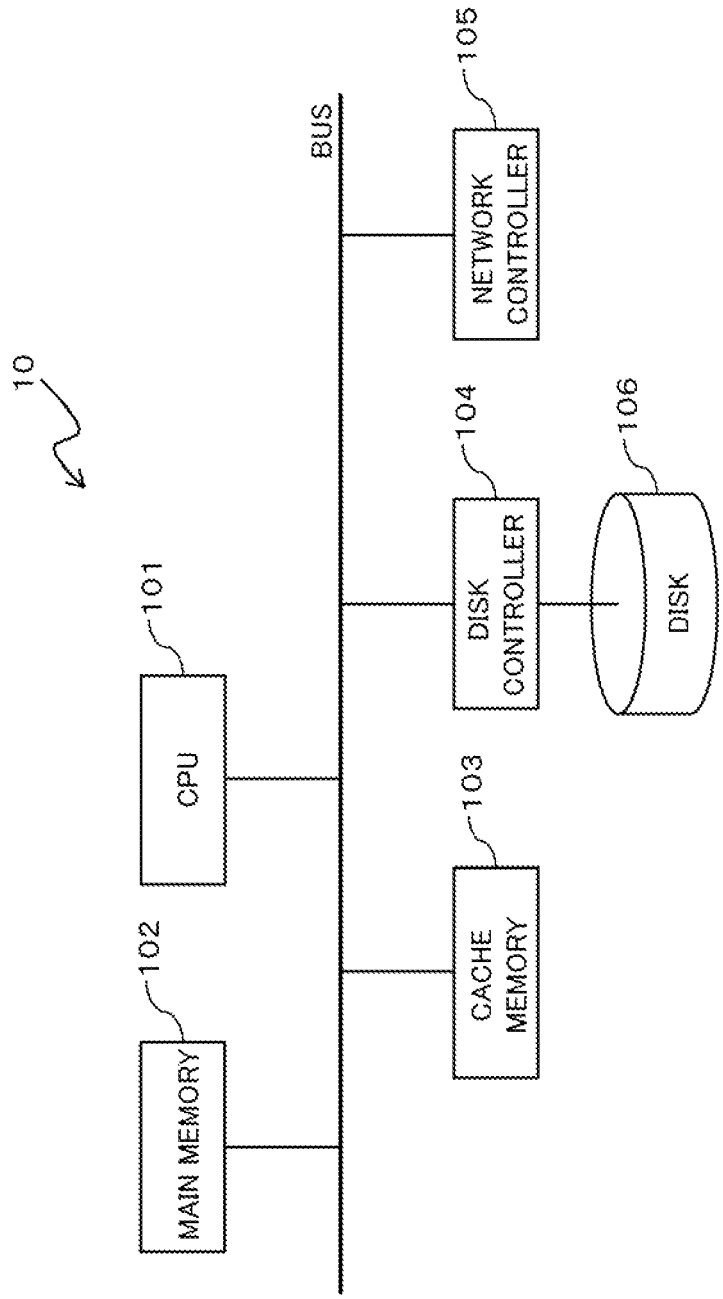
FIG. 3 is a diagram illustrating a hardware configuration of a client terminal of a network system as an example of an embodiment.

FIG. 3 is a diagram illustrating a hardware configuration of the client terminal 10 of the network system as 1 an example of an embodiment.

As illustrated in FIG. 3, the client terminal 10 includes a CPU 101, a main memory 102, a cache memory 103, a disk controller 104, a network controller 105, and a storage device 106.

The main memory 102 is, for example, a RAM and is used as a primary storage memory or a working memory. For example, a software program related to data communication control or data types for the program are written in the main memory 102. The software program on the main memory 102 is loaded and executed on the CPU 101.

The cache memory 103 is a storage area in which data read from or written to the storage device 106 is temporarily stored.

The disk controller 104 is connected to the storage device 106 and controls writing of data to the disk 106 or reading of data from the disk 106. The storage device 106 is a storage device such as an HDD or an SSD and stores various data. There is a case where the storage device 106 is a disk 106.

The network controller 105 controls data communication through the network 50 and realizes data reception and transmission with the management server 20.

The CPU 101 is a processor that performs various controls or arithmetic operations. The CPU 101 realizes various functions by executing an OS or a program stored in the main memory 102 or the like. That is, as illustrated in FIG. 1, the CPU 101 realizes function as a file access management unit 11 and a data management unit 12. A description about the functions as the file access management unit 11 and the data management unit 12 will be described below.

By executing a management program, the CPU 101 functions as the file access management unit 11 and the data management unit 12.

The program (management program) for realizing the functions as the file access management unit 11 and the data management unit 12 is provided in a form to be recorded in a computer-readable recording medium, such as a flexible disk, a CD (CD-ROM, CD-R, CD-RW, etc.), a DVD (DVD-ROM, DVD-RAM, DVD-R, DVD+R, DVD-RW, DVD+RW, HD DVD, etc.), a Blu-ray disk, a magnetic disk, an optical disk, a magneto-optical disk, or the like. The computer reads the program from the recording medium and transfers and stores the program to an internal storage device or an external storage device. Also, for example, the program may be recorded in a storage device (recording medium) such as a magnetic disk, an optical disk, or a magneto-optical disk, and be provided from the storage device to the computer through a communication path.

When realizing the functions as the file access management unit 11 and the data management unit 12, the program stored in the internal storage device (the main memory 102 or the cache memory 103 in the present embodiment) is executed by a microprocessor (CPU 101 in the present embodiment) of the computer. At this time, the program stored in the recording medium may be read and executed by the computer.

Also, in the client terminal 10, the CPU 101 executes an application (high-level application) (not illustrated) and various data are generated by the high-level application.

In the storage system 1, for example, data generated in the client terminal 10 is transmitted to the management server 20 and is stored in the storage device 28.

(B) Functional Configuration

FIG. 4 is a diagram illustrating a functional configuration of the network system 1 as an example of an embodiment.

(B-1) Client Terminal

First, the functional configuration of the client terminal 10 will be described.

As illustrated in FIG. 4, the client terminal 10 has functions as a file access management unit 11 and a data management unit 12.

In the client terminal 10, data is managed in units of data.

The file access management unit 11 manages a directory structure (file directory structure) of data (files) to be processed.

Figure 5:
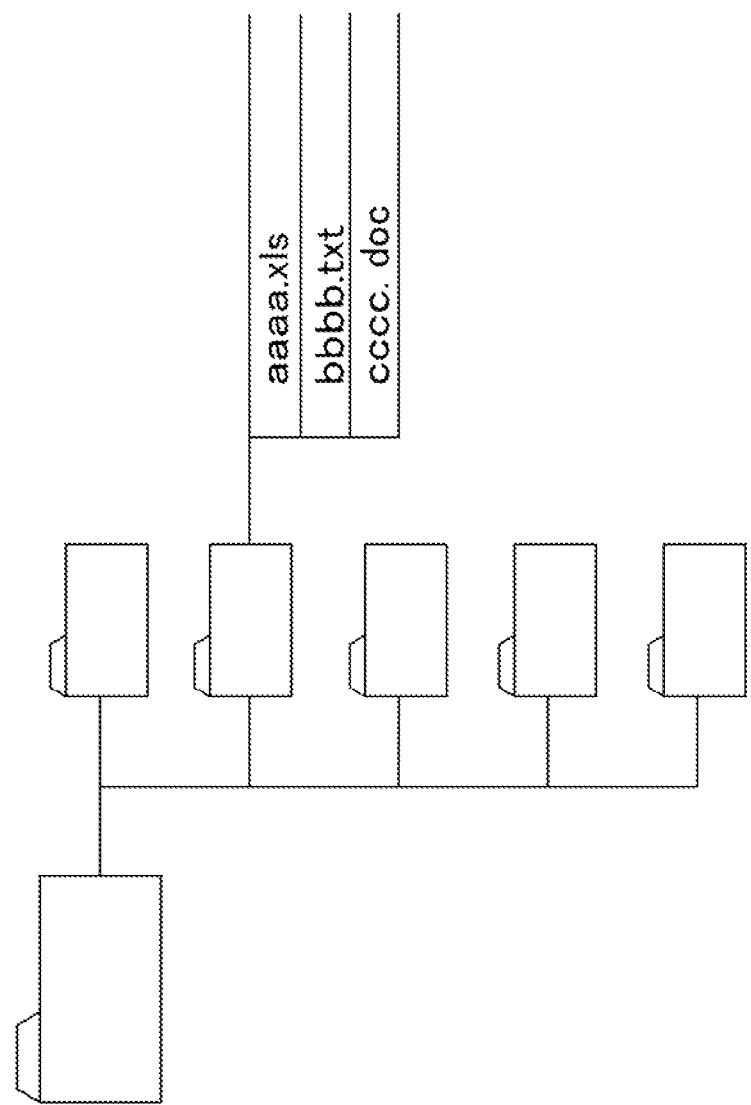
FIG. 5 is a diagram illustrating a file directory structure in a network system as an example of an embodiment.

FIG. 5 is a diagram illustrating a file directory structure in the network system 1 as an example of an embodiment.

In the example illustrated in FIG. 5, a directory structure having two classes is illustrated. The example illustrated in FIG. 5 shows that three files having file names "aaaa.xls", "bbbb.txt", and "cccc.doc" are stored in one of the two classes.

As such, the file access management unit 11 manages the files in the hierarchical directory structure as in the existing file system provided in the NFS or the CIFS. Also, for example, a plurality of files is organized in a single directory for each group.

The data management unit 12 has functions as a first data shaping unit 13, a data management control unit 14, and a data configuration unit 17.

The data management control unit 14 holds data configuration information for each file and executes a file write command and a file read command. The data management control unit 14 generates a data management table 16 for each file and manages file configuration data by using the data management table 16.

The data management table 16 is generated upon write request from the file access management unit 11 to the management server 20. Also, the information for configuring the data management table 16 is stored in, for example, the storage device such as the main memory 102 or the storage device 106. The data management table 16 is called and loaded on the cache memory 103 upon file write and read.

That is, the main memory 102 or the storage device 106, and the cache memory 103 function as a first storage unit that stores storage position information (sector position) of each division data in the storage device 28, and configuration information for restoring the file from the division data.

In the write request from the file access management unit 11, the data management control unit 14 receives file information data from the file access management unit 11. The data management control unit 14 writes and stores a file configuration number and attribute information in the data management table 16, based on the received file information data. In the cache memory 103, the data management table 16 of the file upon the write or read request is called.

FIGS. 6A and 6B are diagrams illustrating examples of the data management table 16 in the network system 1 as an example of an embodiment. FIG. 6A illustrates an example of the data management table 16 of the file name "aaaa.xls", and FIG. 6B illustrates an example of the data management table 16 of the file name "bbbb.txt".

As illustrated in FIGS. 6A and 6B, the data management tables 16 include configuration information, a disk number, sector position information, and an attribute as items.

The configuration information indicates the number of division of files (processing target data) divided in the division data of a predetermined size by the data shaping unit 13 to be described below, and the order for reproducing the file from the division data. In the examples illustrated in FIGS. 6A and 6B, the file is divided in units of sectors (512 bytes) and a serial number of natural numbers is used as the configuration information.

For example, in the example illustrated in FIG. 6A, the file having the file name "aaaa.xls" is reproduced by combining six division data of configuration numbers 1 to 6.

The disk number is identification information that identifies the storage device 28 to which the division data is written or is to be written in the management server 20.

The sector position information is position information of the sector to which that the division data is written or is to be written in the storage device 28. In the examples illustrated in FIGS. 6A and 6B, as the sector position information, the sector position is designated in a logical block addressing (LBA). The method of designating the sector position is not limited to the LBA and can be variously modified. For example, addresses can be used.

The disk number and the sector position information are notified to the management server 20 to be described below.

The attribute is attribute information on the file. In the examples illustrated in FIGS. 6A and 6B, a time stamp indicating a file generation time is used as attribute 1

The data management control unit 14 generates the data management table 16 of the target file when receiving a request for file write to the storage device 28 of the management server 20 from the file access management unit 11.

For example, the data management control unit 14 determines the maximum value of the configuration number by dividing the data size of the processing target file by the sector size, and inputs the configuration number and the time stamp (attribute 1) to the data management table 16 as the configuration number.

When writing data to the management server 20, the data management control unit 14 transmits a write destination sector securement request (storage position securement request) of the file data to the management server 20. In the write destination sector securement request, the data size and the attribute (time stamp) of the file data are included as the file information data.

That is, the data management control unit 14 functions as a second transmission unit that transmits the write destination sector securement request (storage position securement request) of the file data to the management server 20.

In a sector management control unit 24 of the management server 20, as described below, when an empty sector securement determination is successful, sector position information (sector information) of the empty sector is responded from the sector management control unit 24.

Also, the data management control unit 14 distributes the sector position information to each configuration number of the data management table 16, based on the received sector information. That is, the data management unit 12 functions as an allocation unit that allocates the division data constituting the file, respectively, to the plurality of sector positions notified from the management server 20.

At this time, the data management control unit 14 can achieve the improvement of security when an unauthorized access occurs by randomly distributing the sectors notified from the management server 20 to the configuration numbers (division data).

Also, in the case of reading the file from the management server 20, the data management control unit 14 reads the disk number, the sector position information, and the attribute from the data management table 16 with respect to the file to be read, and transmits such information and a file acquisition request to the management server 20 as a file configuration data request. The attribute included in the file configuration data request is used for collation determination by the sector management control unit 24 of the management server 20 to be described below, and functions as collation information.

When writing the file to the management server 20, the first data shaping unit 13 generates division data by dividing data of the file to be processed in units of predetermined sizes, and adds a header containing the write destination information (storage position information) to such division data.

The first data shaping unit 13 refers to the data management table 16 and divides the file data from a head of the data in units of predetermined size units (sector size units in the present embodiment) according to the configuration information. First division transmission data is generated by adding a header to each head of the divided data (division data), wherein the header includes the disk number and the sector position information (storage position information) being the storage destination of the division data, and the attribute information. Hereinafter, there is a case where the first division transmission data is the header-added data.

Figure 7:
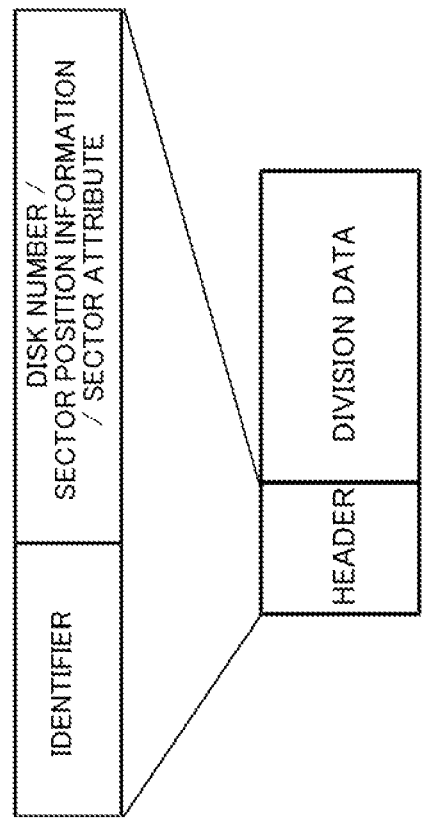
FIG. 7 is a diagram illustrating a structure of first division transmission data in a network system as an example of an embodiment.

FIG. 7 is a diagram illustrating a structure of the first division transmission data generated by the first data shaping unit 13 in the network system 1 as an example of an embodiment.

The first data shaping unit 13 divides the file data, which is received from the file access management unit 11, from the head of the file data in order of the configuration numbers according to the data management table 16, and adds the header to the divided data. That is, the first division transmission data is configured as the header-added data including the division data and header. Since the division of the file data can be realized using various known methods, a description thereof will be omitted.

Also, when dividing the file, the maximum size (for example, 512 bytes) of the disk sector of the write destination is used as a division size. The header including the identification number (disk number) of the write destination disk corresponding to the configuration number read from the data management table at the time of division, the write destination sector position information, the time stamp at the time of generating the file management table, and the identifier information for identifying the header is added to the division data cut out by the division.

The header is added to the head of the division data and the identifier information inside the header is located at the head of the header. In this way, since it is possible to transmit data as single data by connecting the header-added data at the time of data transmission, packet transmission efficiency is increased. In this case, the header-added data shaped by the first data shaping unit 13 is held in the cache memory 103 in a certain amount and is transmitted after connecting the data.

Also, the first data shaping unit 13 transmits the generated first division transmission data to the management server 20.

That is, the first data shaping unit 13 functions as a first transmission unit that transmits, to the management server 20, the division storage data in which the storage position information indicating the storage position of the division data is added to the division data.

The data configuration unit 17 reconfigures (restores) the file from the data received from the management server 20 (second division transmission data, division data, sector data) at the time of a data read process.

The data configuration unit 17 identifies the header of the second division transmission data (header-added data, details will be described below) received from the management server 20 and reads the header information. The data configuration unit 17 refers to the data management table 16 based on the read header information. Therefore, the configuration number can be known based on the sector position information.

The data configuration unit 17 holds the configuration number and the division data in the cache memory 103 with respect to each of the received second division transmission data, and reconfigures the file by connecting the division data in the order of the configuration numbers.

That is, the data configuration unit 17 functions as a restoration unit that restores the file (processing target data) from the division data received from the management server 20, based on the configuration number of the data management table 16.

(B-2) Management Server

Next, the functional configuration of the management server 20 will be described.

As illustrated in FIG. 4, the management server 20 has functions as a data processing unit 21 and a sector management unit 22

The data processing unit 21 controls a data write or read with respect to the storage device 28. The data processing unit 21 receives a data write request or a data read request from the sector management unit 22 to be described below, and performs a data write and a data read to the sector of the storage device 28 in response to the corresponding request.

The sector management unit 22 has functions as a data analysis unit 23, a sector management control unit 24, and a second data shaping unit 27.

The data analysis unit 23 reads the header of the first division transmission data received from the client terminal 10, and performs control to write the division data of the first division transmission data to a predetermined sector of the storage device 28.

When the first division transmission data is received from the client terminal 10, the data analysis unit 23 specifies the header position based on the identifier information included in the first division transmission data and reads the header information.

The data analysis unit 23 specifies the write destination sector of the division data of the first division transmission data, based on the disk number and the sector position information included in the header. That is, the storage device 28 is specified based on the disk number, and the sector position inside the storage device 28 is specified based on the sector position information.

By requesting the data processing unit 21 to write data to a predetermined sector, the data analysis unit 23 writes the division data to the sector of the corresponding storage device 28.

Also, in a case where the first division transmission data is received from the client terminal 10 in response to the write request, the data analysis unit 23 notifies an error to the client terminal 10, which is the transmission source of the first division transmission data, when it is determined by the sector management control unit 24 to be described below that data are mismatched.

The sector management control unit 24 manages information related to the sectors of all the storage devices 28 provided in the data center.

The sector management control unit 24 manages all sectors by using a sector management table 26 in which information of all sectors constituting the storage device 28 is registered. The sector management control unit 24 generates the sector management table 26 for each of the storage devices 28.

FIGS. 8A and 8B are diagrams illustrating examples of the sector management table 26 in the network system 1 as an example of an embodiment. FIG. 8A illustrates an example of the sector management table 26 of the disk 1, and FIG. 8B illustrates an example of the sector management table 26 of the disk 2.

As illustrated in FIGS. 8A and 88B, the sector management table 26 is configured by associating a state item and an attribute item with respect to the sector position information.

The sector position information is information that specifies the sector constituting the storage device 28. In the examples illustrated in FIGS. 8A and 8B, 1 to 6 are shown as the sector position information. The sector position information of the sector management table 26 specifies the sector position in the same manner as the above-described data management table 16. In the present embodiment, the sector position information is indicated by using the LBA (logical address number).

The state indicates the state of the sector. In the present embodiment, any one state selected from "empty", "used", and "reserved" is registered as the state of the sector.

Figure 9:
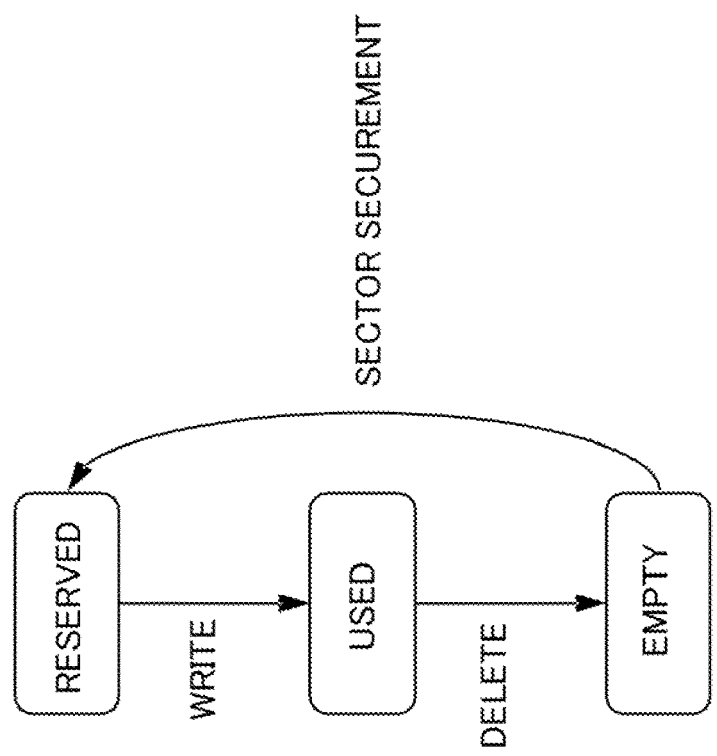
FIG. 9 is a diagram illustrating a state transition of a sector in a storage system as an example of an embodiment.

FIG. 9 is a diagram illustrating a state transition of a sector in the storage system 1 as an example of an embodiment.

Any one state selected from "reserved", "used", and "empty" is necessarily allocated to the state of the sector, and a default is "empty". When secured by the sector securement request from the client terminal 10, the sector of the "empty" state transitions to the "reserved" state ("empty" →"reserved").

That is, at the time of the data write process with respect to the storage device 28, when an "empty" sector is secured in response to a write request from the client terminal 10, the state of the sector transitions from "empty" to "reserved".

The sector of the "reserved" state transitions to the "used" state by writing the data (first division transmission data) transmitted from the client terminal 10 ("reserved"→"used").

That is, in the data write process with respect to the storage device 28, the state transitions from "reserved" to "used" at the time of updating the sector management table 26 by the sector information acquired when reading the data received from the client terminal 10.

When there is a data delete request from the client terminal 10 and it is designated to the sector to be deleted, the state transitions to the "empty" state ("used"→"empty").

That is, the state transitions from "used" to "empty" at the time of receiving the data delete request from the client terminal 10.

The attribute is attribute information on the sector. In the examples illustrated in FIGS. 8A and 8B, time stamp information indicating a sector reservation time is held as the attribute 1. The sector reservation time is a time when the sector securement request is transmitted from the data management unit 12 of the client terminal 10, and is matched with the file generation time of the client terminal 10. That is, the same value as the attribute 1 corresponding to the sector position in the data management table 16 is registered in the attribute 1 of the sector management table 26.

Also, information other than the time stamp may be used in the attribute. In the examples illustrated in FIGS. 8A and 8B, in addition to an attribute 1, an attribute 2 is provided. Also, in the sector management table 26, other information may be managed as the attribute.

The information for configuring the sector management table 26 is stored in, for example, the storage device 28 or the main memory 202, and the sector management table 26 is called to the cache memory 203 of the management server 20 at the time of the file write and the file read with respect to the storage device 28.

That is, the storage device 28 or the main memory 202, and the cache memory 203 function as a second storage unit that stores the attribute information on the division data stored in the sector position in association with the sector position (storage position) of the storage device 28.

As described below, in the storage system 1, all attributes of the designated sectors must be matched when the attribute of the sector inside the sector management table 26 is updated.

Also, when the sector securement request is received from the data management unit 12 of the client terminal 10 together with file size (file information data), the sector management control unit (empty sector securing means) 24 secures as many empty sectors as can store the target file among the empty sectors of the storage device 28 in response to the sector securement request.

That is, the sector management control unit 24 reads the file size from the received file information data and calculates the number of the sectors needed to be secured. The sector management control unit 24 searches as many empty sectors as needed to be secured (corresponding to the file size) with reference to the sector management table 26. Also, at this time, the sector management control unit 24 randomly determines the sectors serving as the file storage destination among the empty sectors. Also, the sector management control unit 24 determines (secures) the sectors serving as the file storage destination over the plurality of storage devices 28.

For example, the sector management control unit 24 randomly extract the empty sectors with reference to the sector management table 26 of each disk. It is determined whether the extracted empty sector is across the plurality of disks, and the random extraction is repeated until the extracted empty sector is across the plurality of disks.

Therefore, by randomly securing the sector of the file storage destination on the management server 20 side, it is possible to store the data at the sector level in a distributed manner.

Also, it is preferable that the sector management control unit 24 determines a plurality of sectors as the file storage destination such that the sector positions are discontinuous in the same storage device 28. Therefore, even when the data of the storage device 28 is read by an unauthorized access, it is possible to make it difficult to reproduce the file.

The sector management control unit (sector management table updating means) 24 secures the empty sector corresponding to the file size received as the file information data with reference to the sector management table 26, and updates the state of the secured sector from "empty" to "reserved" in the sector management table 26. Also, the sector management control unit 24 stores the time stamp in the sector management table 26 as the attribute in association with each secured sector, wherein the time stamp is included in the file information data transmitted together with the write destination sector securement request.

After that, the sector management control unit 24 transmits the secured sector position information to the data management unit 12 of the client terminal 10.

That is, the sector management control unit 24 functions as a selection unit that selects a plurality of sector positions (storage positions) from the storage device 28 in response to the write destination sector securement request (storage position securement request) from the client terminal 10 and notifies sector position information indicating the plurality of sector positions to the client terminal 10.

Therefore, it is possible to grasp the storage destination sector information of the file data in the client terminal 10 and it is also possible to designate the storage destination sector position information from the client terminal 10.

Also, when the file read request or the file write request (access request) with respect to the storage device 28 is received from the client terminal 10, the sector management control unit 24 determines whether the designated sector can be read with reference to the sector management table 26.

Specifically, the sector management control unit 24 reads the attribute (attribute information) from the sector management table 26 in each piece of the sector position information included in the file configuration data request, and performs matching determination (determination process) by determining whether all the attributes are matched with the attributes (collation information) included in the file configuration data request.

That is, the sector management control unit 24 functions as a determination unit that, when a request for access to the storage device 28 is received from the client terminal 10, performs a determination process based on the collation information transmitted from the client terminal 10 and the attribute information read from the sector management table 26.

When it is determined that there is the matching in the matching determination (pass), that is, when the attributes of all sectors from which the file is to be read is matched with the attributes included in the file configuration data request, the sector management control unit 24 updates the state of the corresponding sector from "reserved" to "used" in the sector management table 26. Also, the sector management control unit 24 requests the data processing unit 21 to write the corresponding data (division data) to a predetermined sector.

Therefore, the sector management control unit 24 functions as a storage control unit that stores the division data of the first division transmission data received from the client terminal 10 in the storage device 28 according to the sector position (storage position information) added to the first division transmission data.

Also, at this time, the sector management control unit 24 may determine whether the states of all sectors of the file read target in the sector management table 26 are "used".

On the other hand, when the result of the matching determination is fail, that is, when the attribute information of the received first division transmission data is not matched with the attribute information of the sector management table 26, the sector management control unit 24 prevents the corresponding division data from being read from the storage device 28. Also, the sector management control unit 24 transmits a write error to the data management unit 12 of the client terminal 10.

That is, the sector management control unit 24 has a function as a prohibition unit that prohibits the access to the storage device 28 when the matching determination (determination process) is that mismatching is detected.

The sector management control unit (matching determination means) 24 performs processing according to reading of the file as described above, when the sector management control unit 24 receives a sector delete request from the data management unit 12 in the client terminal 10. That is the sector management control unit 24 determines whether the designated sector can be deleted by determining whether the attribute information received in response to the delete request is matched with the attribute information registered in the sector management table 26 at the delete target sector position of the division data. When the attribute information is matched, the sector management control unit 24 executes a sector data delete with respect to the data processing unit 21.

The second data shaping unit (header adding means) 27 generates the second division transmission data (header-added data, response data) by adding the header, which contains the sector position information and the disk number indicating the corresponding sector, to the sector data (division data) read from the sector of the storage device 28. The second data shaping unit 27 (data transmitting means) transmits the generated second division transmission data to the client terminal 10.

That is, the second data shaping unit 27 functions as a third transmission unit that reads the division data from the storage device 28 according to the sector position information added to the read request received from the client terminal 10, and transmits the read division data to the client terminal 10.

Figure 10:
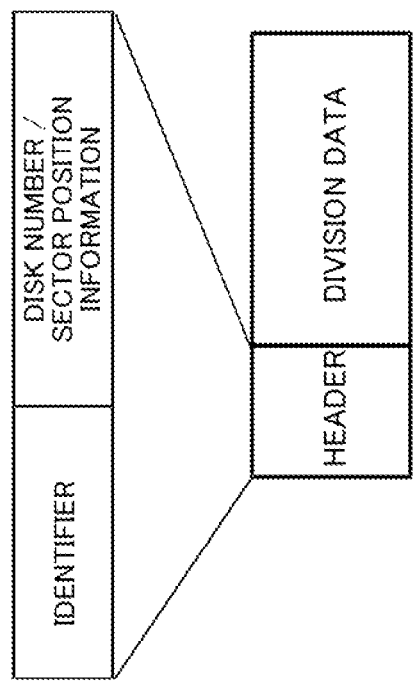
FIG. 10 is a diagram illustrating a structure of response data generated by a first data shaping unit in a network system as an example of an embodiment.

FIG. 10 is a diagram illustrating the structure of the response data generated by the first data shaping unit 13 in the network system as an example of an embodiment.

As illustrated in FIG. 10, the second data shaping unit 27 adds the header, which contains the sector position at which the corresponding sector data is stored and the disk number indicating the storage device 28, to the data (sector data, division data) read from the sector of the storage device 28 by the data processing unit 21.

The header is added to the head of the sector data and the identifier information inside the header is located at the head of the header. Therefore, as in the first division transmission data, the header-added data (transmission data) shaped in the second data shaping unit 27 is held in a certain amount in the cache memory 203 and is transmitted after encapsulation (after connection).

(C) Operation (C-1) File Write Process

Figure 11:
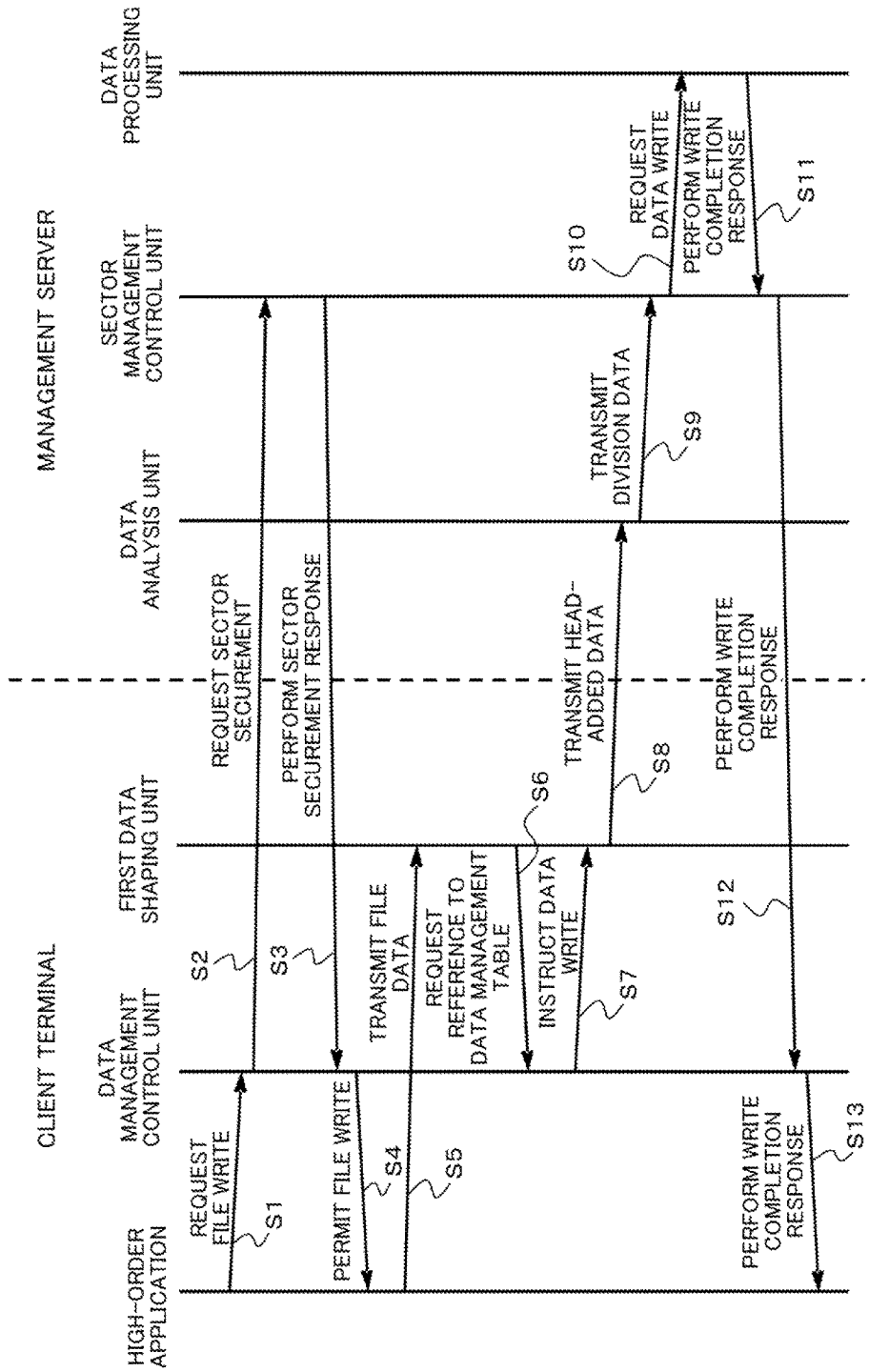
FIG. 11 is a sequence diagram describing a process when writing a file from a client terminal to a management server in a storage system as an example of an embodiment.

In the storage system 1 configured as above as the example of the embodiment, a process when writing a file from the client terminal 10 to the management server 20 will be described with reference to a sequence diagram illustrated in FIG. 11.

In the client terminal 10, when a file write request is performed from the high-level application to the data management control unit 14 (see reference sign S1), the data management control unit 14 transmits a sector securement request of the storage device 28 to the sector management control unit 24 of the management server 20 (see reference sign S2). The data write process in the client terminal 10 will be described with reference to a flowchart of FIG. 12.

In the management server 20, the sector management control unit 24 performs a sector securement discontinuously and randomly over the plurality of storage devices 28 among the empty sectors according to the file size of the processing target. At this time, the sector management control unit 24 updates the state from "empty" to "reserved" with respect to the selected sector in the sector management table 26 of the target storage device 28, and stores the time stamp in the attribute.

When the sector securement is completed, the sector management control unit 24 notifies the secured sector together with the sector securement response to the data management unit 12 of the client terminal 10 (see reference sign S3). The sector securement process in the sector management control unit 24 will be described with reference to a flowchart illustrated in FIG. 13.

The data management unit 12 notifies a file write permission to the high-level application (see reference sign S4), and the high-level application transmits the file data to the first data shaping unit 13 (see reference sign 35). Specifically, the file data is transmitted from the file access management unit 11 to the data management unit 12.

The first data shaping unit 13 requests the data management unit 12 to refer to the data management table 16 (see reference sign S6). The data management unit 12 permits the first data shaping unit 13 to refer to the data management table 16, and instructs the first data shaping unit 13 to write data to the management server 20 (see reference sign S7).

The first data shaping unit 13 generates a plurality of division data by dividing the processing target file in units of sector size units, and generates the first division transmission data (header-added data) by adding the header containing the disk number, the sector position information, and the attribute extracted from the data management table 16. The first data shaping unit 13 transmits the generated first division transmission data to the management server 20 (see reference sign S8). The process of transmitting the first division transmission data from the client terminal 10 to the management server 20 will be described below with reference to a flowchart illustrated in FIG. 14.

In the management server 20, the data analysis unit 23 reads the header of the received first division transmission data, specifies the sector position of the storage destination, and transmits the specified sector position to the sector management control unit 24 together with the division data (see reference sign S9). After performing matching determination on the received division data, the sector management control unit 24 writes the division data to a predetermined sector of the storage device 28 in the data processing unit 21 (see reference sign S10). The data write process in the management server 20 will be described with reference to a flowchart illustrated in FIG. 15.

When the writing of the division data to the sector of the storage device 28 is completed, the data processing unit 21 performs a completion response to the sector management control unit 24 (see reference sign S11). When the completion response is received, the sector management control unit 24 performs the write completion response to the data management unit 12 of the client terminal 10 and the data management unit 12 performs the write completion response to the high-level application (see reference signs S12 and S13).

Figure 12:
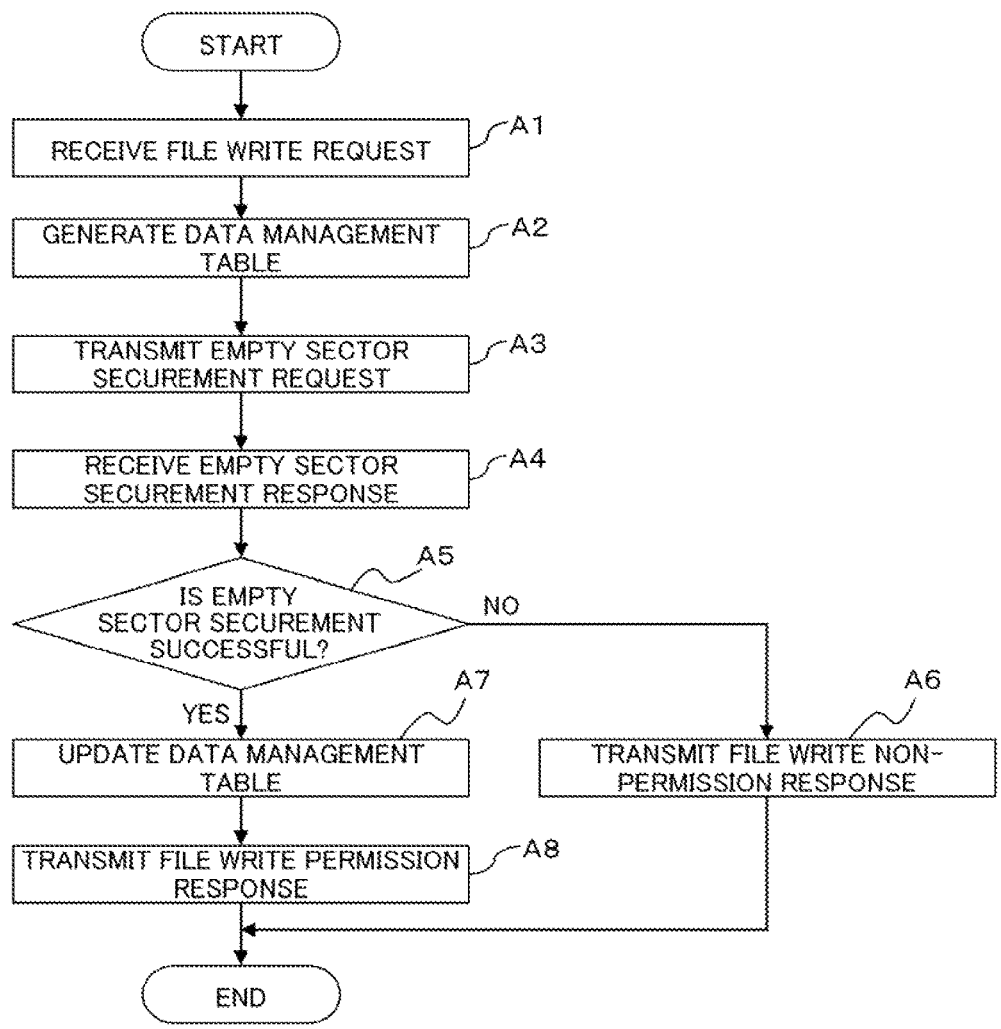
FIG. 12 is a flowchart describing a process when a data management function unit of a client terminal receives a file write request in a storage system as an example of an embodiment.

In the storage system 1 as the example of the embodiment, the process when the data management unit 12 of the client terminal 10 receives the file write request will be described with reference to a flowchart (steps A1 to A8) illustrated in FIG. 12.

When the file write request is received from the file access management unit 11 (step A1), the data management unit 12 generates the data management table 16 of the target file (step A2). Also, at this time, the data management unit 12 inputs the configuration number and the attribute information (time stamp) to the data management table 16.

Furthermore, the data management control unit 14 performs the empty sector securement request (write destination sector securement request) by transmitting the file size and the time stamp to the sector management unit 22 of the management server 20 (step A3).

The data management control unit 14 receives a response to the empty sector securement request from the management server 20 (step A4).

In step A5, the data management control unit 14 confirms whether the empty sector securement is successful in the management server 20. When it is confirmed that the empty sector securement is failed (see NO route of step A5), the data management control unit 14 responds the file write non-permission to the file access management unit 11 (step A6) and ends the process.

On the other hand, when the empty sector securement is successful in the management server 20 (see YES route of step A5), the data management control unit 14 distributes the sector position information received from the sector management unit 22 of the management server 20 to each configuration number of the data management table 16. At this time, by randomly distributing the sector position to each configuration number, it is possible to improve the security when an unauthorized access occurs.

The data management control unit 14 performs updating by registering the distributed sector position to each configuration number in the data management table 16 (step A7). Also, the data management control unit 14 responds the file write permission to the file access management unit 11 (step A8) and ends the process.

Figure 13:
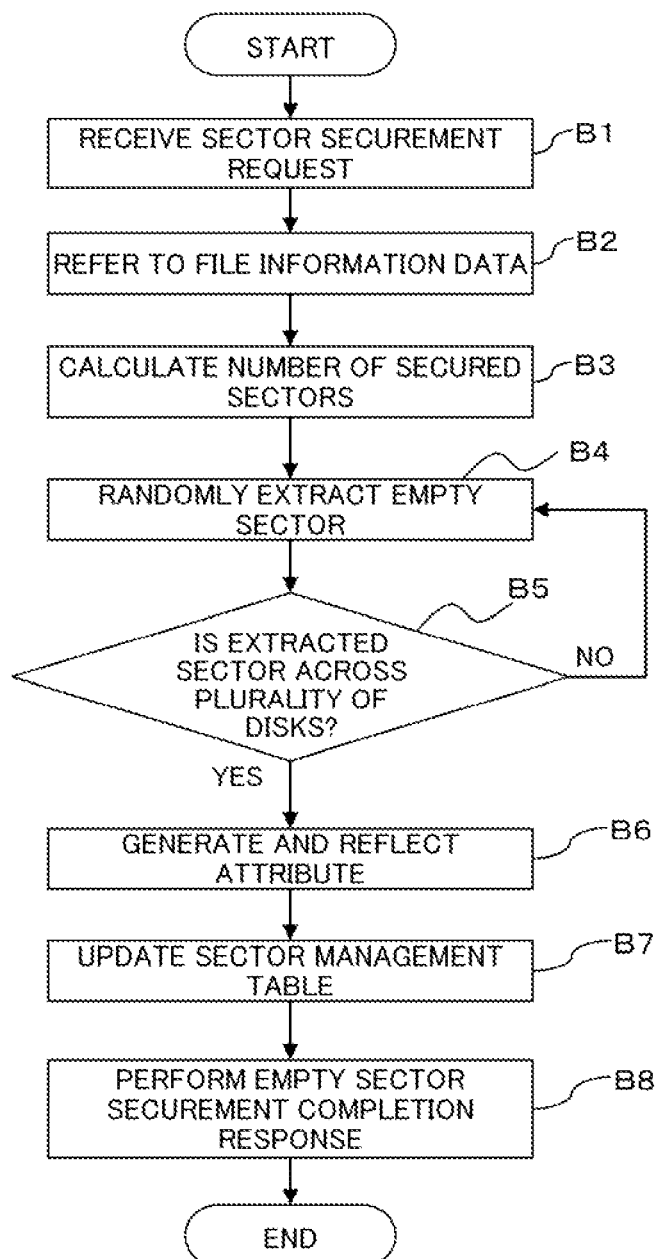
FIG. 13 is a flowchart describing an empty sector securement process in a management server of a storage system as an example of an embodiment.

Next, the empty sector securement process in the management server 20 of the storage system 1 as the example of the embodiment will be described with reference to a flowchart (step B1 to B8) illustrated in FIG. 13.

When the sector securement request is received from the data management unit 12 of the client terminal 10 (step B1), the sector management control unit 24 of the management server 20 refers to the file information data received as the sector securement request from the data management unit 12 (step B2).

The sector management control unit 24 reads the file size from the received file information data and calculates the number of the sectors needed to be secured (step B3).

The sector management control unit 24 randomly extracts as many empty sectors as the calculated number of the sectors needed to be secured with reference to the sector management table 26 for each of the storage devices 28 (step B4).

After that, the sector management control unit 24 determines whether the extracted empty sector is across the plurality of storage devices 28 (step B5).

When it is determined that the extracted empty sector is not across the plurality of storage devices 28 (see NO route of step B5), the process returns to step B4 to randomly extract the empty sector again. Also, at this time, the sector management control unit 24 may randomly extract the empty sectors such that the plurality of selected empty sectors are discontinuous in the storage devices 28.

When it is determined that the extracted empty sector is across the plurality of storage devices 28 (see YES route of step B5), the sector management control unit 24 imparts a new attribute to the selected empty sector (step B6). For example, the sector management control unit 24 extracts the time stamp from the file information data received in step B1 and uses the time stamp as the attribute. Also, the sector management control unit 24 may generate new information to be used as the attribute and register the new information in the sector management table 26.

The sector management control unit 24 updates the sector management table 26 (step B7). That is, the state of the selected empty sector is updated from "empty" to "reserved" and the time stamp is registered in the attribute.

After that, the sector management table 26 performs the empty sector securement completion response to the client terminal 10 (step B8) and ends the process.

Figure 14:
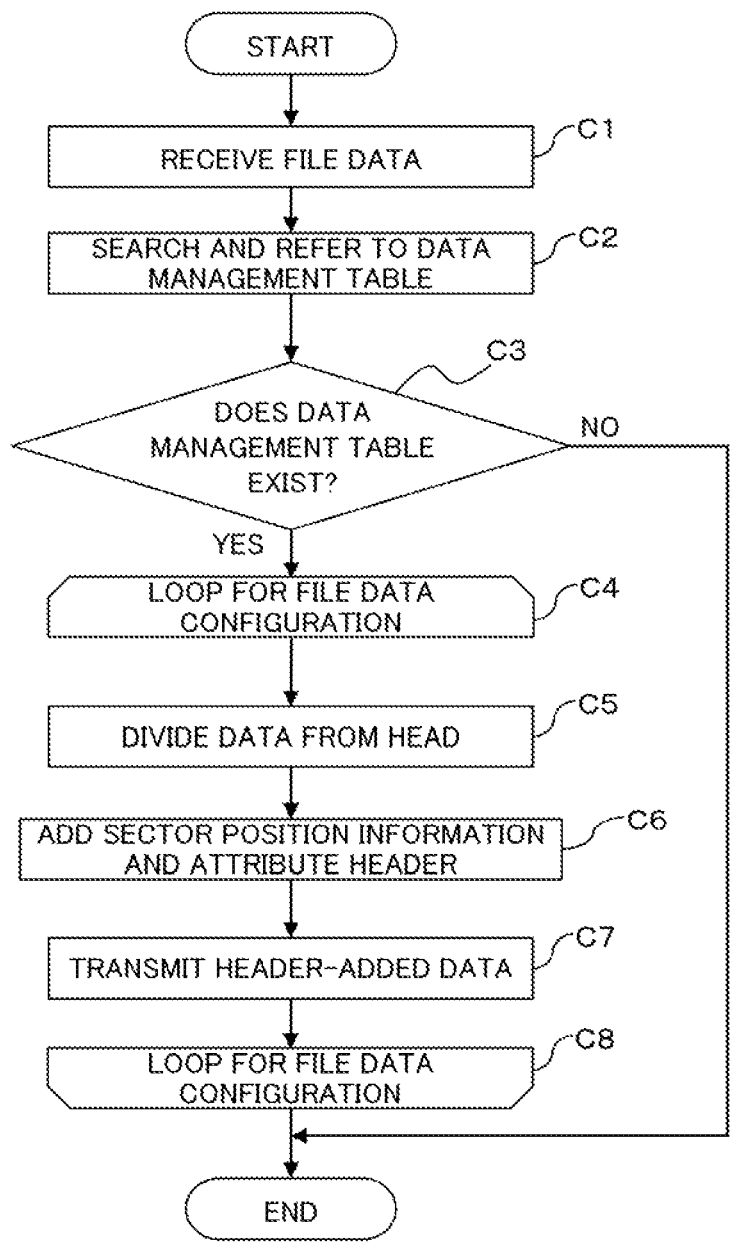
FIG. 14 is a flowchart describing a file data transmit process at the time of performing a file write process from a client terminal of a storage system as an example of an embodiment.

Next, the file data transmission process at the time of the process of writing the file from the client terminal 10 in the storage system 1 as the example of the embodiment will be described with reference to a flowchart (step C1 to C8) illustrated in FIG. 14.

The first data shaping unit 13 of the client terminal 10 performs a data division process of file data.

In the client terminal 10, the first data shaping unit 13 receives the file data from the file access management unit 11 (step C1) and searches and refers to the data management table 16 corresponding to the file data (step C2).

As the result of searching and reference, it is determined whether the data management table 16 corresponding to the file data exists (step C3). When the corresponding data management table 16 does not exist (see NO route of step C3), the process is ended.

When the corresponding data management table 16 exists (see YES route of step C3), after step C4, a loop process of repeating control until step C8 is started with respect to all configuration numbers included in the data management table 16.

In step C5, the first data shaping unit 13 cuts out data by dividing data of the sector size once from the head of the file data and generates the division data.

In step C6, the first data shaping unit 13 reads one row from the top line of the data management table 16, and generates the first division transmission data (header-added data) by adding the header to the generated division data, wherein the header contains the disk number corresponding to the read configuration number, the sector position information, and the time stamp. In step C7, the generated first division transmission data is transmitted to the management server 20.

After that, the control proceeds to step C8. In step C8, the loop end process corresponding to step C4 is executed. Here, when the processes for all configuration numbers are completed, the present flow is ended.

Figure 15:
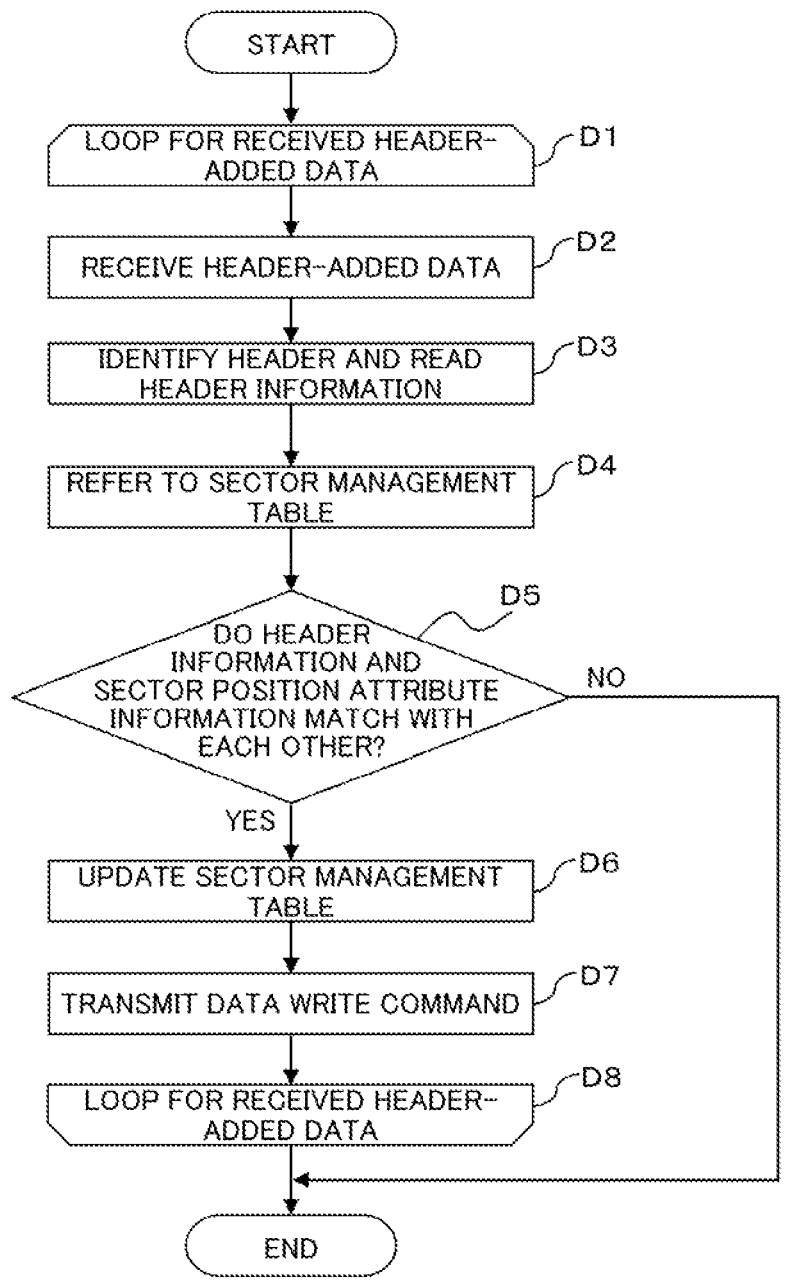
FIG. 15 is a flowchart describing a file write process in a management server of a storage system as an example of an embodiment.

The file write process in the management server 20 of the storage system 1 as the example of the embodiment will be described with reference to a flowchart (step D1 to D8) illustrated in FIG. 15.

In step D1, the loop process of repeating control until step D8 is started with respect to all first division transmission data received from the client terminal 10.

In step D2, the management server 20 receives the first division transmission data (header-added data) from the client terminal 10. In step D3, the data analysis unit 23 specifies the header position based on the identifier information included in the header with respect to the received first division transmission data, and reads the header information.

In step D4, the data analysis unit 23 specifies the write destination sector of the division data of the first division transmission data, based on the disk number and the sector position information included in the header, and refers to the sector management table 26. At the time of the reference, the sector management control unit 24 acquires the header information from the data analysis unit 23. The sector management control unit 24 determines matching determination between the attribute (attribute information) corresponding to the disk number and the sector position included in the header information of the first division transmission data and the attribute (attribute information) of the sector of the write destination in the sector management table 26. That is, it is determined whether the attribute of the header information is matched with the attribute of the sector of the write destination in the sector management table 26 (step D5).

When the result of the matching determination is fail, that is, when the attributes are not matched with each other (see NO route of step D5), the sector management control unit 24 prohibits the division data from being stored in the storage device 28. Also, the data analysis unit 23 transmits a write error to the data management unit 12 of the client terminal 10 and ends the process.

When the result of the matching determination is pass, that is, when the attributes are matched with each other (see YES route of step D5), the state of the sector of the write destination is updated from "reserved" to "used" in the sector management table 26 in step D6.

Also, in step D7, the data analysis unit 23 writes the division data to the corresponding sector of the corresponding storage device 28 by requesting the data processing unit 21 to write data to a predetermined sector, and ends the process.

The above-described processes of step D6 and D7 may be performed in parallel, may be performed regardless of the sequence, and may be performed in various modifications.

After that, the control proceeds to step D8. In step D8, the loop end process corresponding to step D1 is performed. Here, when the processes for all first division transmission data are completed, the present flow is ended.

(C-2) File Read Process

Figure 16:
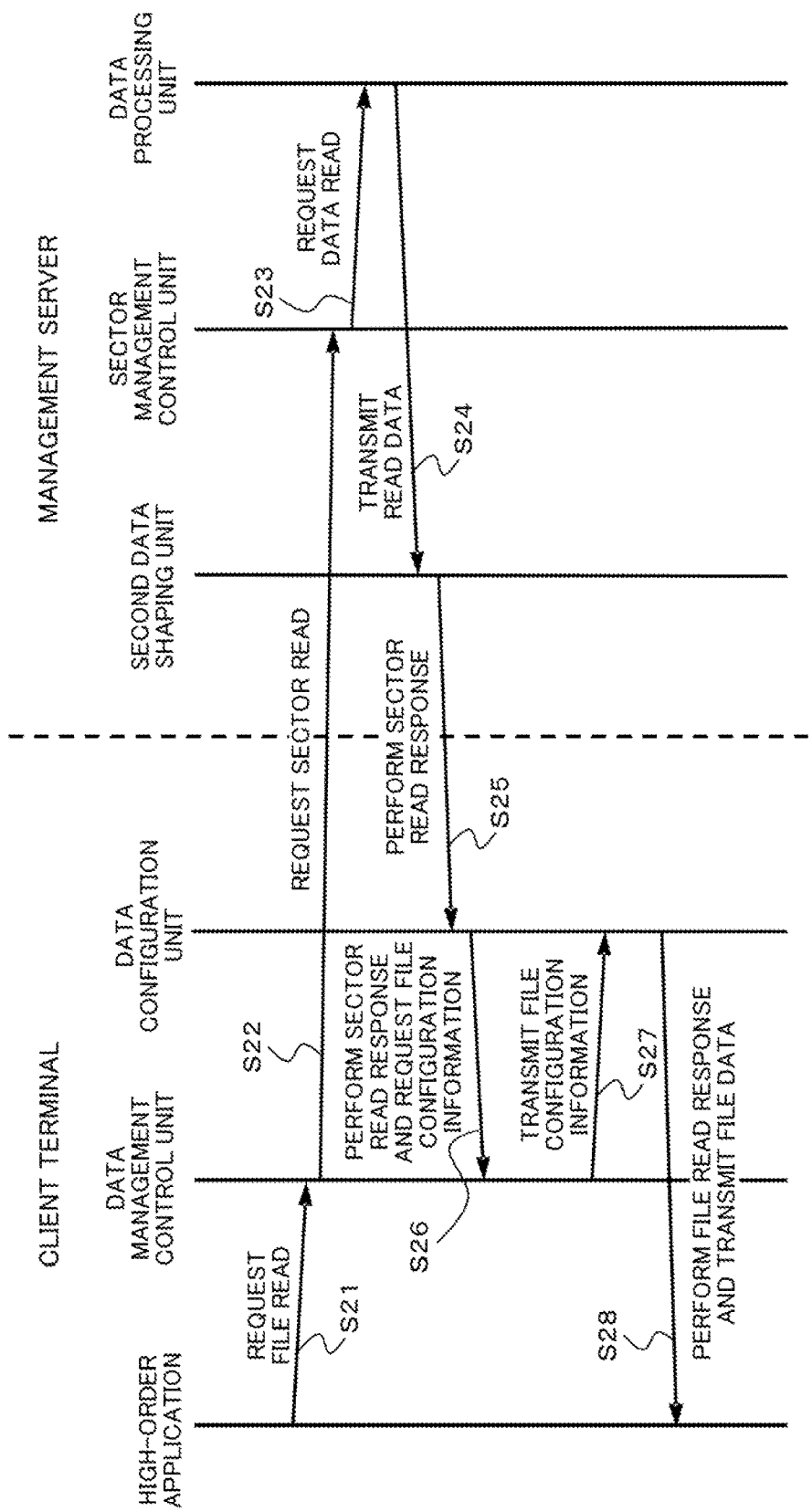
FIG. 16 is a sequence diagram describing a file read process from a client terminal to a management server in a storage system as an example of an embodiment.

Next, in the storage system 1 as the example of the embodiment, a process of reading a file from the client terminal 10 to the management server 20 will be described with reference to a sequence diagram illustrated in FIG. 16.

In the client terminal 10, when a file read request is performed from the high-level application to the data management control unit 14 (see reference sign S21), the data management control unit 14 refers to the data management table 16 of the file to be read. The data management control unit 14 acquires, from the data management table 16, the disk number and the sector position information indicating the storage position of each division data (configuration number) constituting the corresponding file and acquires the attribute thereof.

The data management control unit 14 requests the reading of the file configuration data by transmitting the disk number, the sector position information, and the attribute to the sector management control unit 24 of the management server 20 (see reference sign S22).

In the management server 20, when the sector management control unit 24 receives the read request, the sector management control unit 24 reads the sector management table 26 based on the file configuration data request in response to the corresponding read request, and determines whether the designated sector can be read.

That is, the sector management control unit 24 reads the attribute from the sector management table 26 in each piece of the sector position information included in the file configuration data request, and performs matching determination by determining whether all attributes are matched with the attributes included in the file configuration data request.

As the result of the matching determination, when the attributes are matched with each other, that is, when there is the matching, the sector management control unit 24 instructs the data processing unit 21 to read data stored in the designated sector (see reference sign S23).

The data processing unit 21 reads the data (division data) of the designated sector in response to the read command and transmits the read data to the second data shaping unit 27 (see reference sign S24). Also, the second data shaping unit 27 acquires the disk position or the sector position information corresponding to the sector data with reference to the sector management table 26 with respect to the sector data (division data) read by the data processing unit 21 from the sector management table 26. The second data shaping unit 27 generates the second division transmission data (header-added data) by adding the disk position and the sector position information of the corresponding sector, which are read from the sector management table 26, as the header.

The second data shaping unit 27 transmits the generated second division transmission data to the client terminal 10 as the sector read response (see reference sign S25).

In the client terminal 10, the data configuration unit 17 refers to the data management table 16 managed by the data management control unit 14, based on the read header information, in each of the received second division transmission data (see reference signs S26 and S27). The data configuration unit 17 reconfigures the file by connecting the division data in the order of the configuration numbers in each of the received second division transmission data, and responds the file to the high-level application (see reference sign S28).

Figure 17:
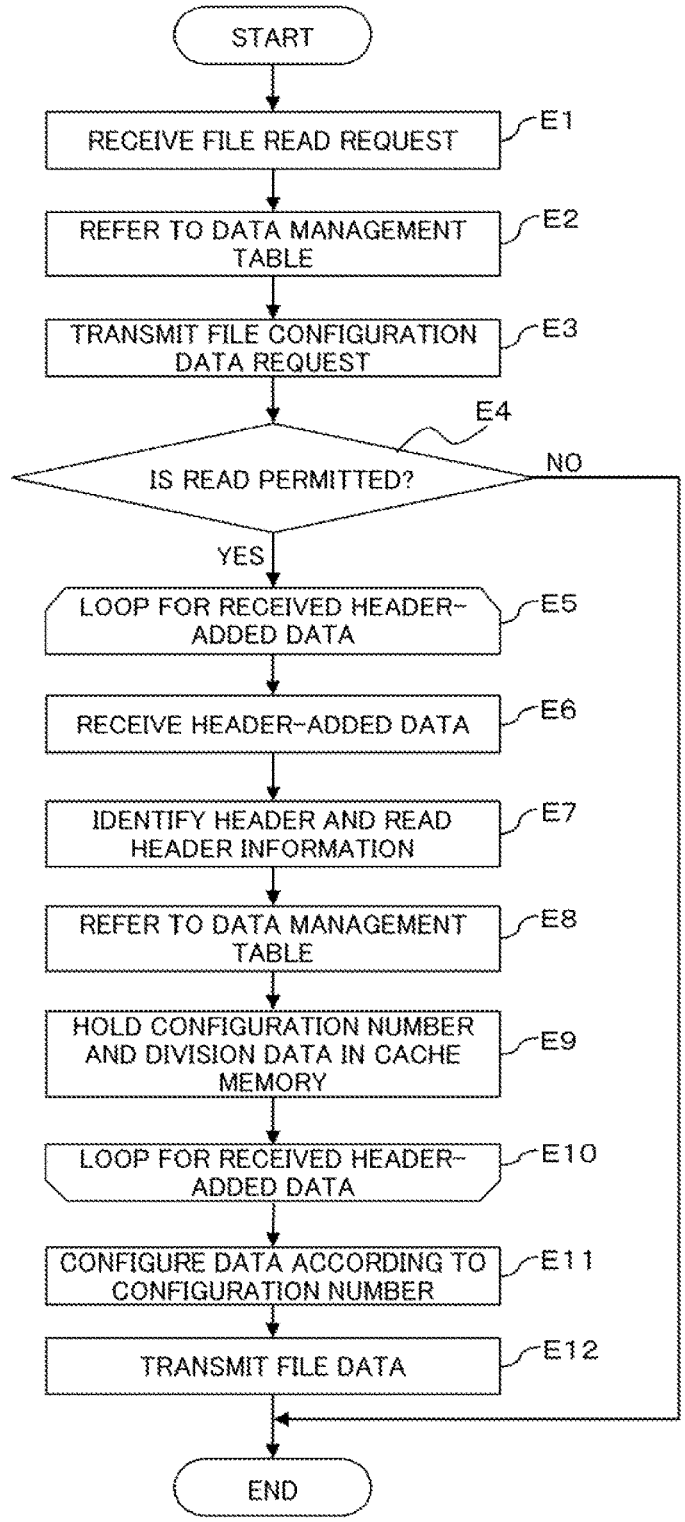
FIG. 17 is a flowchart describing a file read process by a client terminal in a storage system as an example of an embodiment.

The file read process by the client terminal 10 in the storage system 1 as the example of the embodiment will be described with reference to a flowchart (step E1 to E12) illustrated in FIG. 17.

When the client terminal 10 receives the file read request from the file access management unit 11 in step E1, the first data shaping unit 13 refers to the data management table 16 of the target file in step E2. The first data shaping unit 13 calls the data management table 16 of the target file and holds the data management table 16 in the memory.

The first data shaping unit 13 reads, from the referred data management table 16, the disk number and the sector position information being the storage destination, and the time stamp of the attribute in all division data (file configuration data) constituting the corresponding file.

In step E3, the first data shaping unit 13 requests the file configuration data by transmitting the disk number, the sector position information, and the attribute of all division data constituting the target file to the sector management unit 22 of the management server 20 (file configuration data request).

In step E4, it is determined whether the read in the sector management unit 22 of the management server 20 is permitted. When the read is not permitted (see NO route of step E4), an error is notified from the management server 20 and the process is ended.

When the read is permitted from the management server 20 (see YES route of step E4), the data constituting the target file is transmitted from the management server 20 by adding the header thereto.

In step E5, the loop process of repeating control until step E10 is started with respect to the second division transmission data in all file configuration data constituting the file.

In step E6, the data management unit 12 receives the second division transmission data, and in step E7, the data configuration unit 17 identifies the header of the received second division transmission data and reads the header information.

In step E8, the data configuration unit 17 recognizes the configuration number of the division data included in the second division transmission data from the sector position information with reference to the data management table 16 based on the read header information.

In step E9, the data configuration unit 17 stores the recognized configuration number and the division data of the second division transmission data in the cache memory 103. After that, the control proceeds to step E10.

In step E10, the loop end process corresponding to step E5 is performed. Here, when the processes for all second division transmission data constituting the file are completed, the control proceeds to step E11.

In step E11, the data configuration unit 17 reconfigures the file by connecting the division data in the order of the configuration numbers, based on the configuration numbers and the division data held in the cache memory 103.

In step E12, the reconfigured file is transmitted to the file access management unit 11 and the process is ended.

Figure 18:
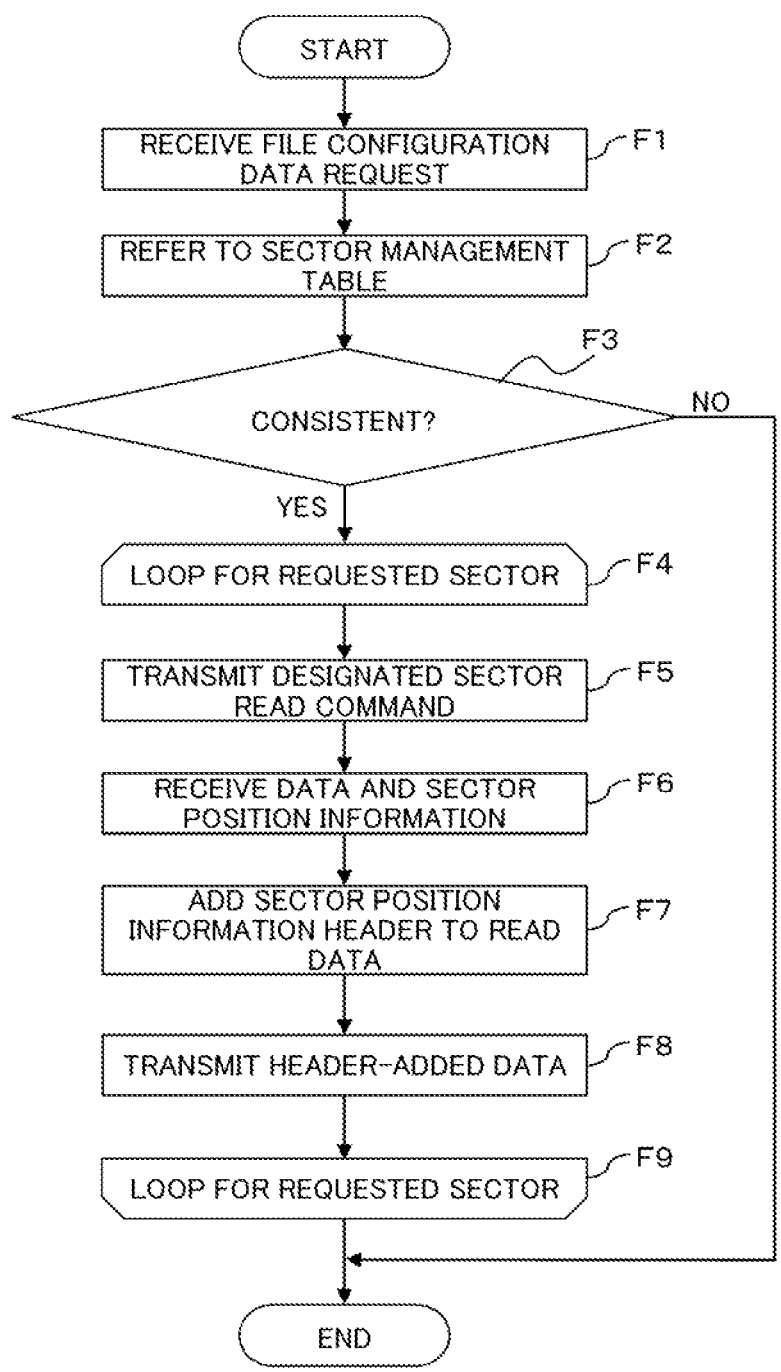
FIG. 18 is a flowchart describing a file read process by a management server in a storage system as an example of an embodiment.

Next, the file read process by the management server 20 in the storage system 1 as the example of the embodiment will be described with reference to a flowchart (step F1 to F9) illustrated in FIG. 18.

In step F1, the sector management control unit 24 of the management server 20 receives the file configuration data request from the data management unit 12 of the client terminal 10. In step F2, the sector management control unit 24 refers to the sector management table 26. In step F3, the sector management control unit 24 performs matching determination of the time stamps and all sector position information of the file configuration data.

When the result of the matching determination is fail, that is, when the attributes included in the file configuration data are not matched with at least a part of the attributes of the corresponding sector of the sector management table 26 (see NO route of step F3), the process is ended.

When the result of the matching determination is pass, that is, when the attributes included in the file configuration data are all matched with the attributes of the corresponding sector of the sector management table 26 (see YES route of step F3), the process proceeds to step P4.

In step F4, the loop process of repeating control until step F9 is started with respect to all sectors being the storage destination of the division data, which is included in the file configuration data request.

In step F5, the sector management control unit 24 instructs the data processing unit 21 to read data stored in the designated sector. The data processing unit 21 reads the data (division data, sector data) from the designated sector of the storage device 28.

In step F6, the second data shaping unit 27 receives the sector data read by the data processing unit 21, and the disk number and the sector position information indicating the storage destination of the corresponding data. In step F7, the second data shaping unit 27 generates the second division transmission data by adding the header data containing the header identifier information for identifying the header, in addition to the disk number and the sector position information, with respect to the read sector data.

In step F8, the generated second division transmission data is transmitted to the client terminal 10.

After that, the control proceeds to step F9. In step F9, the loop end process corresponding to step F4 is performed. Here, when the processes for all designated sectors are completed, the present flow is ended.

(C-3) File Delete Process

Figure 19:
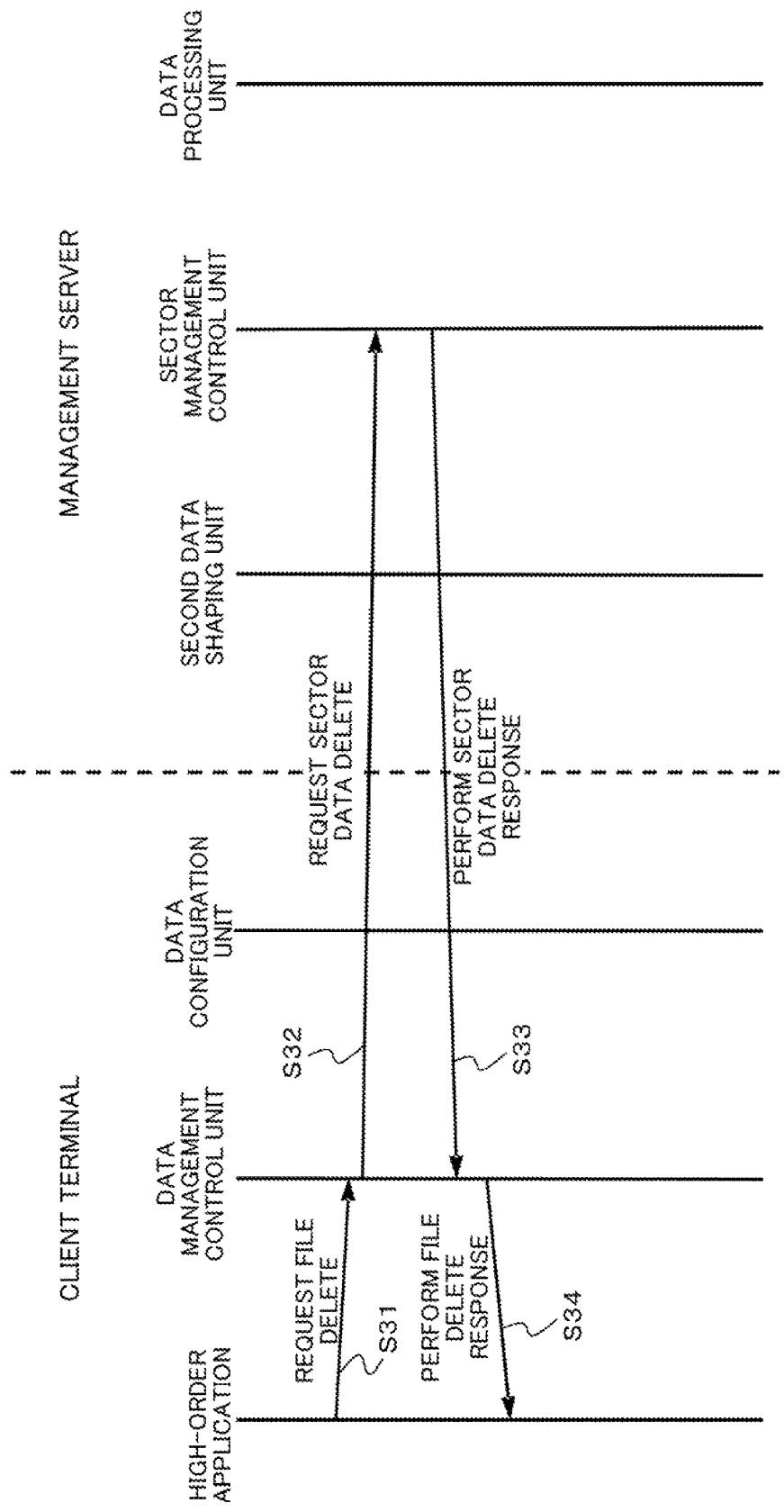
FIG. 19 is a sequence diagram illustrating a file data delete process in a storage system as an example of an embodiment.

Next, a file data delete process in the storage system 1 as the example of the embodiment will be described with reference to FIG. 19.

In the client terminal 10, when a file delete request is performed from the high-level application to the data management control unit 14 (see reference sign S31), the data management control unit 14 transmits a sector delete request to the sector management control unit 24 of the management server 20 (see reference sign S32).

In the management server 20, the sector management control unit 24 deletes data (sector) of the designated sector. For example, the deletion of the sector data is realized by changing the state of the target sector to "empty" in the sector management table 26.

When the detection of the designated sector data is completed, the sector management control unit 24 transmits a sector data delete completion response to the data management control unit 14 of the client terminal 10 (see reference sign S33).

In the client terminal 10, the data management control unit 14 performs the file delete completion response to the high-level application (see reference sign S34) and ends the process.

Figure 20:
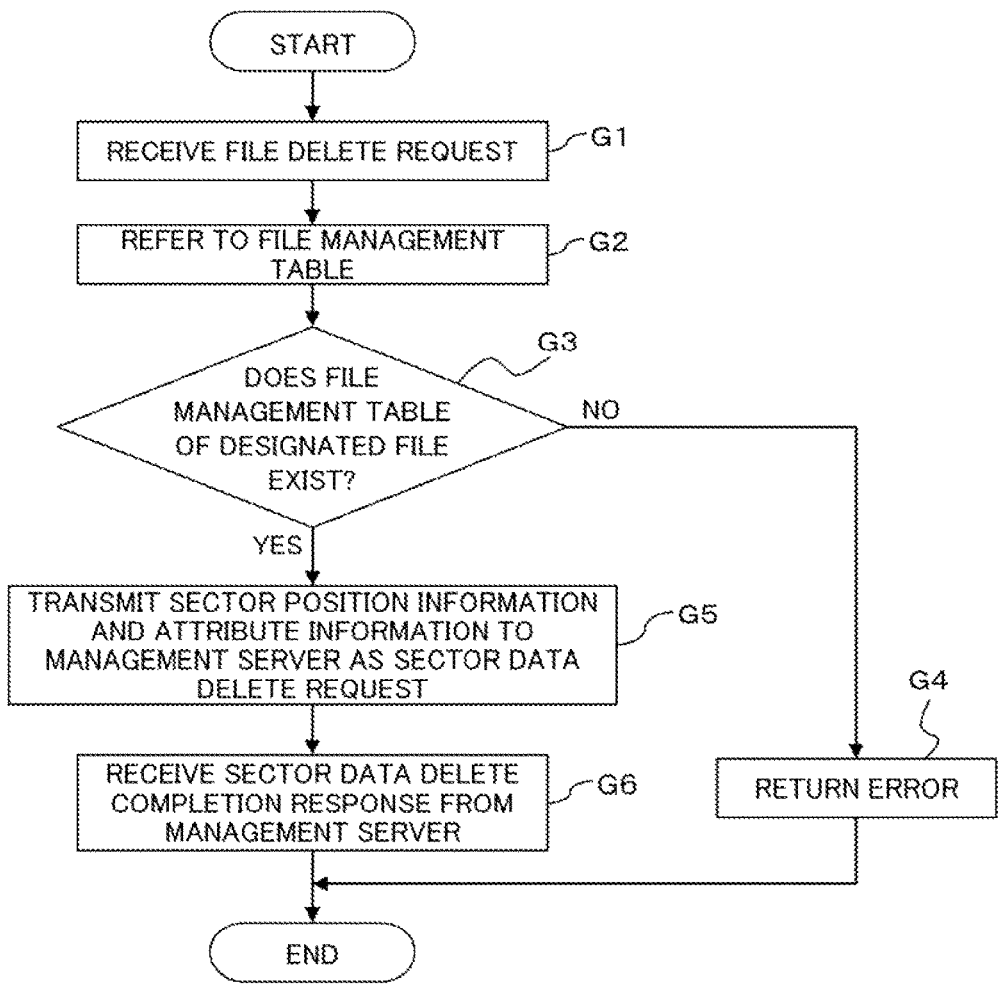
FIG. 20 is a flowchart describing a data file delete process by a client terminal in a storage system as an example of an embodiment.

Next, the data file delete process by the client terminal 10 in the storage system 1 as the example of the embodiment will be described with reference to a flowchart (step G1 to G6) illustrated in FIG. 20.

When the file delete request is received from the file access management unit 11 of the client terminal 10 in step G1, the data management control unit 14 refers to the data management table 16 of the designated file in step G2.

In step G3, the data management control unit 14 determines whether the data management table 16 of the designated file exists. When the data management table 16 of the designated loop does not exist (see NO route of step G3), in step G4, an error response is performed to the file access management unit 11 and the process is ended.

When the data management table 16 of the designated loop exists (see YES route of step G3), in step G5, the data management control unit 14 transmits the disk number and the sector position information of the delete target sector and the attribute information to the management server 20 as the sector data delete request.

In step G6, when the management server 20 receives the sector data delete completion response in response to the transmitted sector data delete request, the data management control unit 14 ends the process. After that, for example, the file delete completion response is performed from the file access management unit 11 to the high-level application.

Next, the data file delete process by the management server 20 in the storage system 1 as the example of the embodiment will be described with reference to a flowchart (step H1 to H6) illustrated in FIG. 21.

When the sector data delete request is received from the client terminal 10 in step H1, the sector management control unit 24 of the management server 20 refers to the sector management table 26 of the designated file by the sector data delete request in step H2.

In step H3, the sector management control unit 24 determines whether the states and attributes of all designated sectors are matched with each other in the sector management table 26. Specifically, the sector management control unit 24 determines whether the states of all designated sectors are "used" and the attribute information is matched.

When the state or the attribute of even one of all designated sectors is not matched with each other (see NO route of step H3), in step H4, an error response is performed to the data management unit 12 of the client terminal 10 and the process is ended.

When the states and the attributes of all designated sectors are matched with each other (see YES route of step H3), in step H5, the sector management control unit 24 updates the state of the target sector to "empty" in the sector management table 26. Therefore, the data of the designated sector is deleted.

In step H6, the sector management control unit 24 transmits a sector data delete completion response to the data management unit 12 of the client terminal 10 and ends the process.

(D) Effects

According to the storage system 1 as the example of the embodiment, the client terminal 10 has the data management table 16 for each file, and the configuration information indicating the configuration of the corresponding file and the storage position (sector) in the management server 20 of the division data divided in units of sector units are managed in the data management table 16.

That is, the data management table 16 managing the configuration numbers constituting the file is provided in the client terminal 10, and the information for constituting the file is held in the management server 20. Therefore, only the data configuration unit 17 of the client terminal 10 can reproduce the original file from the division data.

In this way, even when an unauthorized access is performed to the management server 20 by spoofing, the file cannot be reproduced and it is possible to prevent unauthorized data leakage due to spoofing by the third party. Therefore, it is possible to improve the security level.

The first data shaping unit 13 divides the file into the division data of sector units, generates the first division transmission data by adding the header containing the sector position information acquired from the data management table 16, and transmits the first division transmission data to the management server 20. Therefore, in the network 50 that connects the client terminal 10 and the management server 20, even when the first division transmission data is acquired in an unauthorized manner, it is impossible to reproduce the original file from the first division transmission data, thereby preventing data leakage.

In the management server 20, the sector management control unit 24 secures (selects) the sector of the file storage destination discontinuously and randomly over the plurality of storage devices 28 in response to the write destination sector securement request transmitted from the client terminal 10 and responds to the client terminal 10.

Therefore, in the management server 20, since the storage destination of the data constituting the file is the sector of the discontinuous and random position over the plurality of storage devices 28, the original file cannot be reproduced and the data leakage can be prevented even when the third party accesses the storage device 28 of the management server 20 in an unauthorized manner and reads the data.

Furthermore, in the client terminal 10, the data management unit 12 randomly distributes the sectors notified from the management server 20 to the configuration numbers (division data). Therefore, when an unauthorized access occurs, the improvement of the security can be achieved.

(E) Others

The technology of the disclosure is not limited to the above-described embodiments, and various modifications can be made without departing from the scope of the present embodiments. Each configuration and each process of the present embodiment can be selected to be used or not as is necessary, or the configurations and the processes may be combined as is appropriate.

For example, in the above-described embodiment, for simplicity, the network system 1 is provided with the single client terminal 10 and the single management server 20, but is not limited thereto. That is, the client terminal 10 and the management server 20 may also be provided with a plurality of client terminals and a plurality of management servers, respectively.

Also, the management server 20 has the functions as the data analysis unit 23, the sector management control unit 24, the second data shaping unit 27, and the sector management unit 22, but is not limited thereto. At least a part of the functions may be provided to other information processing device.

Also, the present embodiments disclosed above can be carried out and manufactured by those skilled in the art.

According to an embodiment, even when the storage device is accessed in an unauthorized manner, data leakage can be prevented.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A data access system comprising: a first information processing apparatus; and a second information processing apparatus, wherein the first information processing apparatus includes a storage device configured to store a plurality of division data, into which processing target data is divided, in a plurality of positions,
the second information processing apparatus includes a first storage unit configured to store storage position information of the respective division data of the storage device and configuration information for restoring the processing target data from the division data,
the configuration information is not stored in the first information processing apparatus,
the second information processing apparatus further includes a first transmission unit configured to transmit, to the first information processing apparatus. the division data to which the storage position information indicating the storage position of the division data is added, when the processing target data is written to the storage device,
the first information processing apparatus further includes a storage control unit configured to store the received division data in the storage device according to the storage position information,
the second information processing apparatus further includes a second transmission unit configured to transmit a storage position securement request to the first information processing apparatus when the processing target data is written to the storage device,
the first information processing apparatus further includes a selection unit configured to select a plurality of storage positions from the storage device in response to the storage position securement request and notify the selected storage positions to the second information processing apparatus, and
the second information processing apparatus further includes an allocation unit configured to allocate the division data to the plurality of storage positions notified by the selection unit, respectively.

2. The data access system according to claim 1,
wherein the first information processing apparatus further includes a plurality of storage devices, and
wherein the selection unit is configured to select the storage position from the plurality of storage devices of the first information processing apparatus.

3. The data access system according to claim 1, wherein the selection unit is configured to select a plurality of positions, which is randomly selected among empty spaces of the storage device, as the storage positions.

4. The data access system according to claim 1, wherein the selection unit is configured to select a plurality of discontinuous positions among empty spaces of the storage device as the storage positions.

5. The data access system according to claim 1,
wherein the second information processing apparatus is configured to transmit a read request, to which the storage position information indicating the storage position of the division data constituting the processing target data is added, to the first information processing apparatus, when the processing target data is read from the storage device,
wherein the first information processing apparatus further includes a third transmission unit configured to read the division data from the storage device according to the storage position information to which the received read request is added, and to transmit the read division data to the second information processing apparatus, and
the second information processing apparatus further includes a restoration unit configured to restore the processing target data from the division data, based on the configuration information.

6. A data access system comprising: a first information processing apparatus: and a second information processing apparatus, wherein the first information processing apparatus includes a storage device
configured to store a plurality of division data, into which processing target data is divided, in a plurality of positions,
the second information processing apparatus includes a first storage unit configured to store storage position information of the respective division data of the storage device and configuration information for restoring the processing target data from the division data, and
the configuration information is not stored in the first information processing apparatus,
the first information processing apparatus further includes:
a second storage unit configured to store attribute information about the division data stored in the corresponding storage positions in association with the storage positions of the storage device;
a determination unit configured perform determination processing based on collation information transmitted from the second information processing apparatus and the attribute information, upon reception of a request for access to the storage device from the second information processing apparatus; and
a prohibition unit configured to prohibit the access to the storage device when it is determined that mismatching is detected by the determination unit.

7. The data access system according to claim 1, wherein the first information processing apparatus is configured to store state information indicating a state of the storage position in association with the storage position of the storage device.

8. A data access method of a data access system, which includes a first information processing apparatus with a storage device, and a second information processing apparatus, the data access method comprising:
storing, by the first information processing apparatus, a plurality of division data, into which processing target data is divided, in a plurality of positions of the storage device,
storing, by the second information processing apparatus, storage position information of the respective division data of the storage device and configuration information for restoring the processing target data from the division data,
transmitting, by the second information processing apparatus, to the first information processing apparatus, the division data to which the storage position information indicating the storage position of the division data is added, when the processing target data is written from the second information processing apparatus to the storage device,
storing, by the first information processing apparatus, the received division data in the storage device according to the storage position information
transmitting, by the second information processing apparatus, a storage position securement request to the first information processing apparatus when the processing target data is written from the second information processing apparatus to the storage device,
notifying, by the first information processing apparatus, the second information processing apparatus of a plurality of storage positions selected from the storage device in response to the storage position securement request, and allocating, by the second information processing apparatus, the division data to the plurality of notified storage positions, respectively,
wherein the configuration information is not stored in the first information processing apparatus.

9. A data access method of a data access system, which includes a first information processing apparatus with a storage device, and a second information processing apparatus, the data access method comprising:
storing, by the first information processing apparatus, a plurality of division data, into which processing target data is divided, in a plurality of positions of the storage device,
storing, by the second information processing apparatus, storage position information of the respective division data of the storage device and configuration information for restoring the processing target data from the division data,
storing, by the first information processing apparatus, attribute information about the division data stored in the corresponding storage positions in association with the storage positions of the storage device;
performing, by the first information processing apparatus, determination processing based on collation information transmitted from the second information processing apparatus and the attribute information, upon reception of a request for access to the storage device from the second information processing apparatus; and
prohibiting, by the first information processing apparatus, the access to the storage device when it is determined that mismatching is detected in the determination processing,
wherein the configuration information is not stored in the first information processing apparatus.

10. The data access system according to claim 6, wherein the second information processing apparatus further includes a first transmission unit configured to transmit, to the first information processing apparatus, the division data to which the storage position information indicating the storage position of the division data is added, when the processing target data is written to the storage device, and wherein the first information processing apparatus further includes a storage control unit configured to store the received division data in the storage device according to the storage position information.

11. The data access system according to claim 10, wherein the second information processing apparatus includes a second transmission unit configured to transmit a storage position securement request to the first information processing apparatus when the processing target data is written to the storage device, wherein the first information processing apparatus includes a selection unit configured to select a plurality of storage positions from the storage device in response to the storage position securement request and notify the selected storage positions to the second information processing apparatus, and wherein the second information processing apparatus includes an allocation unit configured to allocate the division data to the plurality of storage positions notified by the selection unit, respectively.

12. The data access system according to claim 11, wherein the first information processing apparatus further includes a plurality of storage devices, and wherein the selection unit is configured to select the storage position from the plurality of storage devices of the first information processing apparatus.

13. The data access system according to claim 11, wherein the selection unit is configured to select a plurality of positions, which is randomly selected among empty spaces of the storage device, as the storage positions.

14. The data access system according to claim 11, wherein the selection unit is configured to select a plurality of discontinuous positions among empty spaces of the storage device as the storage positions.

15. The data access system according to claim 6, wherein the second information processing apparatus is configured to transmit a read request, to which the storage position information indicating the storage position of the division data constituting the processing target data is added, to the first information processing apparatus, when the processing target data is read from the storage device, wherein the first information processing apparatus further includes a third transmission unit configured to read the division data from the storage device according to the storage position information to which the received read request is added, and to transmit the read division data to the second information processing apparatus, and the second information processing apparatus further includes a restoration unit configured to restore the processing target data from the division data, based on the configuration information.

16. The data access system according to claim 6, wherein the first information processing apparatus is configured to store state information indicating a state of the storage position in association with the storage position of the storage device.

* * * * *